US008542884B1

(12) United States Patent
Maltby, II

(10) Patent No.: US 8,542,884 B1
(45) Date of Patent: Sep. 24, 2013

(54) SYSTEMS AND METHODS FOR FLOOD AREA CHANGE DETECTION

(75) Inventor: David R. Maltby, II, Austin, TX (US)

(73) Assignee: Corelogic Solutions, LLC, Santa Ana, CA (US)

( * ) Notice: Subject to any disclaimer, the term of this patent is extended or adjusted under 35 U.S.C. 154(b) by 1794 days.

(21) Appl. No.: 11/601,574

(22) Filed: Nov. 17, 2006

(51) Int. Cl.
  *G06K 9/00* (2006.01)
  *G06K 9/34* (2006.01)

(52) U.S. Cl.
  USPC .......................... 382/113; 382/106; 382/175

(58) Field of Classification Search
  USPC ............. 382/106, 108, 113, 175, 190; 702/2, 702/4, 5; 345/20, 568, 583, 584
  See application file for complete search history.

(56) References Cited

U.S. PATENT DOCUMENTS

| | | | |
|---|---|---|---|
| 3,811,043 A * | 5/1974 | Cope et al. ..................... | 362/489 |
| 4,766,539 A | 8/1988 | Fox | |
| 4,831,526 A | 5/1989 | Luchs et al. | |
| 4,876,648 A | 10/1989 | Lloyd | |
| 4,885,706 A | 12/1989 | Pate et al. | |
| 4,975,840 A | 12/1990 | DeTore et al. | |
| 4,984,279 A * | 1/1991 | Kidney et al. .................. | 382/113 |
| 5,434,957 A * | 7/1995 | Moller ........................... | 345/593 |
| 5,546,107 A | 8/1996 | Deretsky et al. | |
| 5,559,707 A | 9/1996 | DeLorme et al. | |
| 5,715,376 A * | 2/1998 | Nakayama .................... | 358/1.9 |
| 5,719,949 A * | 2/1998 | Koeln et al. ................... | 382/113 |
| 5,796,634 A | 8/1998 | Craport et al. | |
| 5,839,113 A | 11/1998 | Federau et al. | |
| 5,848,373 A | 12/1998 | DeLorme et al. | |
| 5,864,632 A * | 1/1999 | Ogawa et al. ................. | 382/113 |
| 5,873,066 A | 2/1999 | Underwood et al. | |
| 5,913,210 A | 6/1999 | Call | |
| 5,946,687 A | 8/1999 | Gehani et al. | |
| 5,953,722 A | 9/1999 | Lampert et al. | |
| 5,968,109 A | 10/1999 | Israni et al. | |
| 5,978,520 A * | 11/1999 | Maruyama et al. ........... | 382/294 |
| 6,005,961 A * | 12/1999 | Na ................................. | 382/113 |
| 6,101,496 A | 8/2000 | Esposito | |
| 6,115,669 A | 9/2000 | Watanabe et al. | |
| 6,118,404 A | 9/2000 | Fernekes et al. | |

(Continued)

OTHER PUBLICATIONS

Carincotte et al. "Unsupervised Change Detection on SAR Images using Fuzzy Hidden Markov Chains" Department of Multidimensional Signal Processing Feb. 1, 2005, pp. 1-9.*

(Continued)

*Primary Examiner* — Chan S Park
*Assistant Examiner* — Mia M Thomas
(74) *Attorney, Agent, or Firm* — Oblon, Spivak, McClelland, Maier & Neustadt, L.L.P.

(57) ABSTRACT

In various embodiments, old flood maps may be compared to new flood maps to determine which areas of the flood map have changed. These changed areas may be correlated against geographic area descriptions that are within changed areas of the flood map. The changed areas may also be analyzed to determine whether each area has had a change in status (e.g., from a high risk flood zone to a non-high risk flood zone or vice versa) or a change in zone within a status (e.g., from one flood zone to another flood zone). The information on type of change (or no change) may be used to populate a database that includes geographic area description identifiers. In some embodiments, detection of certain types of changes may initiate a manual comparison of the old and new flood maps to verify the change.

36 Claims, 26 Drawing Sheets

(56) References Cited

U.S. PATENT DOCUMENTS

| | | | |
|---|---|---|---|
| 6,119,065 A | 9/2000 | Shimada et al. | |
| 6,163,770 A | 12/2000 | Gamble et al. | |
| 6,263,343 B1 | 7/2001 | Hirono | |
| 6,308,177 B1 | 10/2001 | Israni et al. | |
| 6,408,085 B1* | 6/2002 | Yuen | 382/113 |
| 6,467,994 B1 | 10/2002 | Ankeny et al. | |
| 6,498,982 B2 | 12/2002 | Bellesfield et al. | |
| 6,529,824 B1 | 3/2003 | Obradovich et al. | |
| 6,539,080 B1 | 3/2003 | Bruce et al. | |
| 6,591,270 B1 | 7/2003 | White | |
| 6,631,326 B1 | 10/2003 | Howard et al. | |
| 6,678,615 B2 | 1/2004 | Howard et al. | |
| 6,684,219 B1 | 1/2004 | Shaw et al. | |
| 6,711,554 B1 | 3/2004 | Salzmann et al. | |
| 6,829,690 B1 | 12/2004 | Ashby | |
| 6,836,270 B2 | 12/2004 | Du | |
| 6,842,698 B2 | 1/2005 | Howard et al. | |
| 6,873,998 B1* | 3/2005 | Dorum et al. | 1/1 |
| 6,889,141 B2 | 5/2005 | Li et al. | |
| 6,934,634 B1 | 8/2005 | Ge | |
| 6,947,842 B2 | 9/2005 | Smith et al. | |
| 6,950,519 B2 | 9/2005 | Rhoads | |
| 6,967,745 B1* | 11/2005 | Konno et al. | 358/1.9 |
| 6,970,593 B2* | 11/2005 | Furukawa | 382/154 |
| 6,985,606 B1* | 1/2006 | Wilkinson | 382/109 |
| 6,985,844 B1* | 1/2006 | Ernst et al. | 703/21 |
| 7,003,138 B2* | 2/2006 | Wilson | 382/113 |
| 7,038,681 B2 | 5/2006 | Scott et al. | |
| 7,042,470 B2 | 5/2006 | Rhoads et al. | |
| 7,054,741 B2 | 5/2006 | Harrison et al. | |
| 7,061,510 B2 | 6/2006 | Rhoads | |
| 7,082,443 B1 | 7/2006 | Ashby | |
| 7,085,650 B2 | 8/2006 | Anderson | |
| 7,092,957 B2 | 8/2006 | Klein | |
| 7,099,492 B2 | 8/2006 | Rhoads | |
| 7,099,882 B2 | 8/2006 | McDonough | |
| 7,114,050 B2 | 9/2006 | Ashby | |
| 7,117,192 B2* | 10/2006 | Waltz et al. | 706/48 |
| 7,117,199 B2 | 10/2006 | Frank et al. | |
| 7,127,107 B2 | 10/2006 | Kubota et al. | |
| 7,142,217 B2 | 11/2006 | Howard et al. | |
| 7,161,604 B2 | 1/2007 | Higgins et al. | |
| 7,167,187 B2 | 1/2007 | Scott et al. | |
| 7,184,572 B2 | 2/2007 | Rhoads et al. | |
| 7,190,377 B2 | 3/2007 | Scott et al. | |
| 7,197,160 B2 | 3/2007 | Rhoads et al. | |
| 7,254,249 B2 | 8/2007 | Rhoads et al. | |
| 7,383,125 B2 | 6/2008 | de Silva et al. | |
| 7,536,025 B2* | 5/2009 | Folchetti et al. | 382/100 |
| 7,539,348 B2* | 5/2009 | Adachi | 382/243 |
| 7,630,517 B2* | 12/2009 | Mirowski et al. | 382/109 |
| 7,636,901 B2* | 12/2009 | Munson et al. | 715/855 |
| 7,660,441 B2* | 2/2010 | Chen et al. | 382/113 |
| 7,668,651 B2* | 2/2010 | Searight et al. | 701/208 |
| 7,742,431 B2* | 6/2010 | Ng et al. | 370/254 |
| 7,890,509 B1* | 2/2011 | Pearcy et al. | 707/736 |
| 7,917,292 B1* | 3/2011 | Du | 702/5 |
| 8,077,927 B1* | 12/2011 | Maltby, II | 382/113 |
| 8,078,594 B1* | 12/2011 | Pearcy et al. | 707/692 |
| 2001/0026270 A1* | 10/2001 | Higgins et al. | 345/213 |
| 2001/0026271 A1* | 10/2001 | Higgins et al. | 345/213 |
| 2001/0028348 A1* | 10/2001 | Higgins et al. | 345/213 |
| 2001/0032050 A1* | 10/2001 | Howard et al. | 702/2 |
| 2001/0033292 A1 | 10/2001 | Scott et al. | |
| 2001/0034579 A1* | 10/2001 | Howard et al. | 702/5 |
| 2001/0047326 A1 | 11/2001 | Broadbent et al. | |
| 2002/0035432 A1 | 3/2002 | Kubica et al. | |
| 2002/0041385 A1* | 4/2002 | Onodera | 358/1.9 |
| 2002/0060734 A1* | 5/2002 | Hino et al. | 348/144 |
| 2002/0145617 A1* | 10/2002 | Kennard et al. | 345/634 |
| 2002/0147613 A1* | 10/2002 | Kennard et al. | 705/1 |
| 2003/0042896 A1* | 3/2003 | Abe | 324/210 |
| 2003/0052896 A1 | 3/2003 | Higgins et al. | |
| 2004/0019517 A1 | 1/2004 | Sennott | |
| 2004/0034666 A1 | 2/2004 | Chen | |
| 2004/0046774 A1 | 3/2004 | Rhoads et al. | |
| 2004/0078143 A1* | 4/2004 | Howard et al. | 702/5 |
| 2004/0091171 A1* | 5/2004 | Bone | 382/284 |
| 2004/0128170 A1 | 7/2004 | MacKethan et al. | |
| 2004/0138817 A1 | 7/2004 | Zoken et al. | |
| 2004/0172264 A1 | 9/2004 | Fletcher et al. | |
| 2004/0199410 A1* | 10/2004 | Feyen et al. | 705/4 |
| 2004/0263514 A1 | 12/2004 | Jin et al. | |
| 2005/0034074 A1* | 2/2005 | Munson et al. | 715/712 |
| 2005/0073532 A1* | 4/2005 | Scott et al. | 345/634 |
| 2005/0075911 A1* | 4/2005 | Craven | 705/4 |
| 2005/0091193 A1 | 4/2005 | Frank et al. | |
| 2005/0091209 A1 | 4/2005 | Frank et al. | |
| 2005/0100220 A1 | 5/2005 | Keaton et al. | |
| 2005/0119824 A1 | 6/2005 | Rasmussen et al. | |
| 2005/0159882 A1 | 7/2005 | Howard et al. | |
| 2005/0177529 A1* | 8/2005 | Howard et al. | 706/1 |
| 2005/0203768 A1 | 9/2005 | Florance et al. | |
| 2005/0203778 A1 | 9/2005 | Chen et al. | |
| 2005/0209867 A1 | 9/2005 | Diesch et al. | |
| 2005/0273346 A1 | 12/2005 | Frost | |
| 2005/0283503 A1 | 12/2005 | Hancock et al. | |
| 2005/0288957 A1 | 12/2005 | Eraker et al. | |
| 2005/0288958 A1 | 12/2005 | Eraker et al. | |
| 2006/0036588 A1 | 2/2006 | Frank et al. | |
| 2006/0041375 A1 | 2/2006 | Witmer et al. | |
| 2006/0041573 A1 | 2/2006 | Miller et al. | |
| 2006/0045351 A1 | 3/2006 | Jin et al. | |
| 2006/0072783 A1 | 4/2006 | Rhoads | |
| 2006/0075422 A1 | 4/2006 | Choi et al. | |
| 2006/0100912 A1 | 5/2006 | Kumar et al. | |
| 2006/0125828 A1 | 6/2006 | Harrison et al. | |
| 2006/0126959 A1 | 6/2006 | Padwick et al. | |
| 2006/0262963 A1 | 11/2006 | Navulur et al. | |
| 2006/0265350 A1 | 11/2006 | Klein | |
| 2006/0294062 A1* | 12/2006 | Folchetti et al. | 707/3 |
| 2007/0014435 A1* | 1/2007 | Mirowski et al. | 382/109 |
| 2007/0014488 A1* | 1/2007 | Chen et al. | 382/294 |
| 2007/0055443 A1* | 3/2007 | Sumizawa et al. | 701/209 |
| 2007/0124328 A1 | 5/2007 | Klein | |
| 2007/0257235 A1 | 11/2007 | Park et al. | |
| 2007/0261517 A1 | 11/2007 | Lee et al. | |
| 2008/0055096 A1 | 3/2008 | Aylward | |
| 2008/0082260 A1* | 4/2008 | Kimura | 701/209 |
| 2008/0133462 A1 | 6/2008 | Aylward et al. | |
| 2008/0140311 A1* | 6/2008 | Searight et al. | 701/208 |
| 2008/0290874 A1* | 11/2008 | Seleznev et al. | 324/337 |
| 2010/0100315 A1* | 4/2010 | Davidson et al. | 701/208 |
| 2010/0131196 A1* | 5/2010 | Searight et al. | 701/208 |
| 2012/0211089 A1* | 8/2012 | Piri | 137/14 |

OTHER PUBLICATIONS

Allen et al. "Providing Inundation Decision Support Tools to Coastal Communities" Proceedings of Costal Zone 07 Portland Oregon 7-22 to 7-26, 2007, pp. 1-3.*

Peng et al. "Unsupervised Change Detection for Flood Analysis in SAR Images" (2005) Nat'l Lab of Pattern Recognition, pp. 1-5.*

Coppin et al. "Digital Change Detection Methods in ecosystem monitoring: a review" Int. J Remote Sensing May 10, 2004, vol. 25, No. 9, 1565-1596.*

O'Donnell et al. "Irish Spatial Data Infrastructure Demonstration Programme on Flood Management" Costal and Marine Resources Centre Mar. 2005, pp. 1-29.* van der Sande et al. "A segmentation and classification approach of IKONOS-2 imagery for land cover mapping to assist flood risk and flood damage assessment" International Journal of Applied Earth Observation and Geoinformation 4 (2003), pp. 217-229.*

Shevenell, L. "Analysis of well hydrographs in a karst aquifer: estimates of specific yields and continuum transmissivities" Journal of Hydrology 174 (1996) pp. 331-335.*

Fernandes, M. "Flood damage estimation beyond stage-damage functions: an Australian example" Journal of Flood Risk Management 3 (2010) pp. 88-96.*

Werner et al. "A comparision of Methods for Generating Cross Sections for Flood Modelling Using Detailed Flood Plain (sic) Elevation Models" Delft Univ. (2005).*

Chappell et al. "Goestatistical Analysis of Ground Survey Elevation Data to Elucidate Spatial and Temporal River Channel Change" Earth Surface Processes and Landforms 28, pp. 349-370 (2003).*

NPL_STIC Search Sections A pp. 1 to 3.*

NPL_STIC Search Section B [pp. 1-11.*

Solbo et al. "Towards Operational Flood Mapping with Satelitte SAR" Sep. 9-10, 2004 pp. 1-7.*

Sanders et al. "Decision Support System for Flood Risk Analysis for the River Thames, UK" Photogrammetric Engineering and Remote Sensing Vo. 66, No. 10, Oct. 2000, pp. 1185-1193.*

Merz et al. "Flood Risk Mapping at the Local Scale: Concepts and Challenges" Flood Risk Management in Europe. pp. 231-251.*

Hsu et al. "An Integrated Flood Risk Assessment model for Property Insurance Industry in Taiwan" NAF Hazards (2011) 58: 1295-1309.*

U.S. Appl. No. 13/293,783, filed Nov. 10, 2011, Maltby.

* cited by examiner

First Map

Updated Second Map

First and Second Maps Overlaped

First Map

Updated Second Map

First and Second Maps Overlaped

| | GDT ID | Change Type |
|---|---|---|
| Street Segment A | 5873594 | S |
| Street Segment B | 5894275 | N |
| Street Segment C | 5635241 | S |
| Street Segment D | 5896527 | S |
| Street Segment E | 5894752 | Z |
| Street Segment F | 5896487 | N |
| Street Segment G | 5369721 | Z |
| Street Segment H | 5846752 | Z |
| Parcel A | 5832718 | S |
| Digital Group A | 5637728 | S |

*FIG. 4f*

SYSTEMS AND METHODS FOR FLOOD AREA CHANGE DETECTION

BACKGROUND OF THE INVENTION

1. Field of the Invention

The present invention relates generally to flood maps and, more specifically, to flood area change detection.

2. Description of the Related Art

The National Flood Insurance Reform Act of 1994 extended and reemphasized previous flood insurance acts by requiring federally regulated lenders not to make, increase, extend, or renew any loan on property within a Special Flood Hazard Area (SFHA) unless flood insurance is purchased. The regulations also require flood insurance at any time during the term of a loan if it is determined that a property is within the SFHA. These designations are made and/or modified by the Federal Emergency Management Agency (FEMA). FEMA issues flood maps and flood map revisions on a periodic basis. Zones identified by FEMA on these maps include: A, AO, A1-A30, AE, AR, AR/AO, AR/A1-A30, AR/AE, AR/AH, AR/A99, A99, AH, VO, V1-V30, VE, V, M, E, X, and D. Zones beginning with the letters A or V are considered SFHAs, or high risk flood zones, with A-lettered zones being subject to riverine, lake overflow, ponding, or sheetflow flooding and V-lettered zones being subject to wave velocity flooding. Zone M designates mudslide prone areas and Zone E designates erosion prone areas. Zones B, C, and X designate areas which are outside of the high risk flood zone, but may still be subject to a moderate ("500 year" flood zone, or less than 1 foot depth in a "100 year" flood zone) (shaded Zone X or Zone B) or low (outside of the "500 year" flood zone) (unshaded Zone X or Zone C) flood risk. Zone D is used for areas that have not received a flood hazard evaluation, but may be subject to flooding. Zones B, C, X and D zones are not considered SFHAs.

Because of structural works and improvements, continuing studies, and corrections/additions, the flood zones for an area may change. FEMA, therefore, periodically issues updated flood maps. These updated maps may show that the flood zone classification for some of the areas on the map has changed. For example, some areas that were not in an SFHA may now be in an SFHA (and vice-versa). Lending companies must stay aware of the continuing changes to these flood maps in order to require flood insurance on applicable properties and to notify borrowers when flood insurance is no longer required.

SUMMARY OF THE INVENTION

In an embodiment, flood zones on a flood map may be indicated by comparing two or more flood maps to each other. A first flood map may be compared to an updated second flood map to determine which areas of the flood map have changed between the first flood map and the second flood map. For example, the first flood map and the updated second flood map may be digitized and at least one digitized segment of the first flood map may be compared to at least one digitized segment of the updated second flood map. Each digitized segment of the first flood map may be compared to the corresponding digitized segment (i.e., the same geographical area) of the updated second flood map.

One or more areas may be demarcated (e.g., outlined by polygons) on a change map based on the comparison of the first flood map to the updated second flood map. The one or more areas may include at least one area of a change in status (e.g., from a status as being in a high risk flood zone to a status as a non-high risk flood zone) and at least one area of a change in zone (e.g., a change of flood zone within the same status area, for example, high risk or not). In some embodiments, a street map may be digitized to overlay on the change map. The system may determine which of the one or more demarcated areas is associated (e.g., overlaps) with at least one geographical area description (e.g., a street segment). Street segment data may also be provided, for example, from a map database. In some embodiments, street segments may be defined according to a TIGER (Topologically Integrated Geographic Encoding & Referencing system) standard. While several embodiments are described using street segments, these embodiments also apply for other geographic area descriptions for describing locations. For example, instead of analyzing which demarcated areas are associated with a street segment, an analysis may include determining which demarcated areas are associated with specific parcels (e.g., corresponding to geographic boundaries of specific addresses) or specific digital points (or groups of digital points).

In some embodiments, the one or more demarcated areas associated with the at least one street segment (or other geographic area description) may be prioritized. For example, a determination may be made whether the street segment is associated with at least one area of change in status. The determinations may be made for each street segment on a map. If the street segment is associated with at least one area of change in status, the at least one street segment may be assigned an identifier indicating change in status. If the street segment is not associated with at least one area of change in status, a determination may be made as to whether the street segment is associated with at least one area of change in zone. If the street segment is associated with at least one area of change in zone, the at least one street segment may be assigned an identifier indicating change in zone. If the street segment is not associated with at least one area of change in status and is not associated with at least one area of change in zone, the at least one street segment may be assigned an identifier indicating no change. In one embodiment, the change map may be analyzed to determine if there are other street segments to analyze on the map.

In some embodiments, buffer areas may be placed around demarcated areas and treated as extensions of the areas they are buffering during further analysis. In some embodiments, the size of the buffer may be based on the accuracy of the flood maps alignment and/or the alignment between the flood maps and a street segment map.

In some embodiments, a manual examination of a geographic area description (e.g., a street segment) may be implemented if the geographic area description is associated with at least one area of a change in zone and/or status. For example, even if only a portion of the street segment passes through a change in status area, the entire street segment may be manually inspected by a human user.

In some embodiments, at least one database entry for the geographic area description (e.g., a street segment) may be updated based on the comparison. In some embodiments, the database may not designate specific addresses, but may instead hold information with respect to specific street segments. In some embodiments, the database may designate other geographic area descriptions (e.g., by parcel or group of digital points). The data entries for corresponding street segments in the database may be individually updated with, for example, the status determined for an area through which the street segment passes. In some embodiments, the status may be prioritized (for example, indicator of change type="S" if the street segment passes through a change in status area; indicator of a change type="Z" if the street segment does not pass through a change in status area but does pass through a change in zone area; and indicator of a change type="N" if it passes through neither a change in status area nor a change in zone area.) In some embodiments, the street segments may start with an indicator of change type="N" and then updated in a prioritized order. For example, the indicator of change type="Z" may be assigned for the street segments passing through a change in zone area and then the indicator of change type="S" may be assigned for the street segments passing through a change in status area. This ordering may allow change type="S" identifiers to overwrite change type="Z" identifiers as appropriate. For example, if a street segment is a change type="S" identifier it may also be a change type="Z". By applying the changes in the above described order, the street segments passing even partially through a change in status area may receive a final identifier of change type="S" (which may overwrite the previous applied change type="Z" identifier). Other priorities are also possible.

For each address for which information is needed, an identifier may be determined for the street segment where the address is located. For example, another database may be accessed to determine the identifier for the street segment for which a specific address is located. Using the identifier, information for the street segment may be accessed in the database and returned.

In some embodiments, at least one database entry that corresponds to a property (e.g., designated by address) on at least one of the street segments (or other geographic area descriptions) may be updated. For example, a link may be determined between addresses listed in a database and addresses on a corresponding street segment. The data entries for the corresponding addresses in the database may be individually updated with, for example, the status determined for an area through which the street segment passes. Properties may be referenced, for example, by addresses. In some embodiments, the identifiers may be prioritized (for example, indicated as change type="S" if the street segment passes through a change in status area; indicated as a change type="Z" if the street segment does not pass through a change in status area but does pass through a change in zone area; and indicated as a change type="N" if it passes through neither a change in status area nor a change in zone area.) In some embodiments, the street segments may start with a default identifier of change type="N". Then street segments passing through a change in zone area may receive an identifier of a change type="Z", and then street segments passing through a change in status area may receive an identifier of change type="S" (e.g., to allow change type="S" to overwrite a previous change type="Z"). In some embodiments, at least two database entries which correspond to addresses on the at least one street segment may be updated. In some embodiments, database entries for a range of addresses (e.g., addresses lying on the same street segment) may be updated at once. Database entries for other types of geographic area descriptions may also be updated (e.g., entries specific to parcels).

The one or more demarcated areas may be displayed with respect to at least one street segment or other geographic area description. In some embodiments, the demarcated polygons and street segments (or other geographic area descriptions) may be displayed together (e.g., on a computer monitor). The user may zoom in on selected specific areas, specific street segments, or specific regions of the map. Other interactions between the user and the displayed map are also possible.

In some embodiments, a loan provider, loan recipient, etc. may be notified of a change in status, change in zone, or no change for addresses on which they request information. For example, electronic communications or paper correspondence may be automatically generated for one or more addresses, or groups of addresses, which have had a change in status or zone. Loan providers may then require loan recipients on corresponding addresses to secure flood insurance, secure additional/less flood insurance, or may notify the recipient that flood insurance is no longer required.

BRIEF DESCRIPTION OF THE DRAWINGS

A better understanding of the present invention may be obtained when the following detailed description is considered in conjunction with the following drawings, in which:

FIGS. 4a-f illustrates a series of maps and database entries showing a union process and change detection, according to an embodiment.

Figure 1:
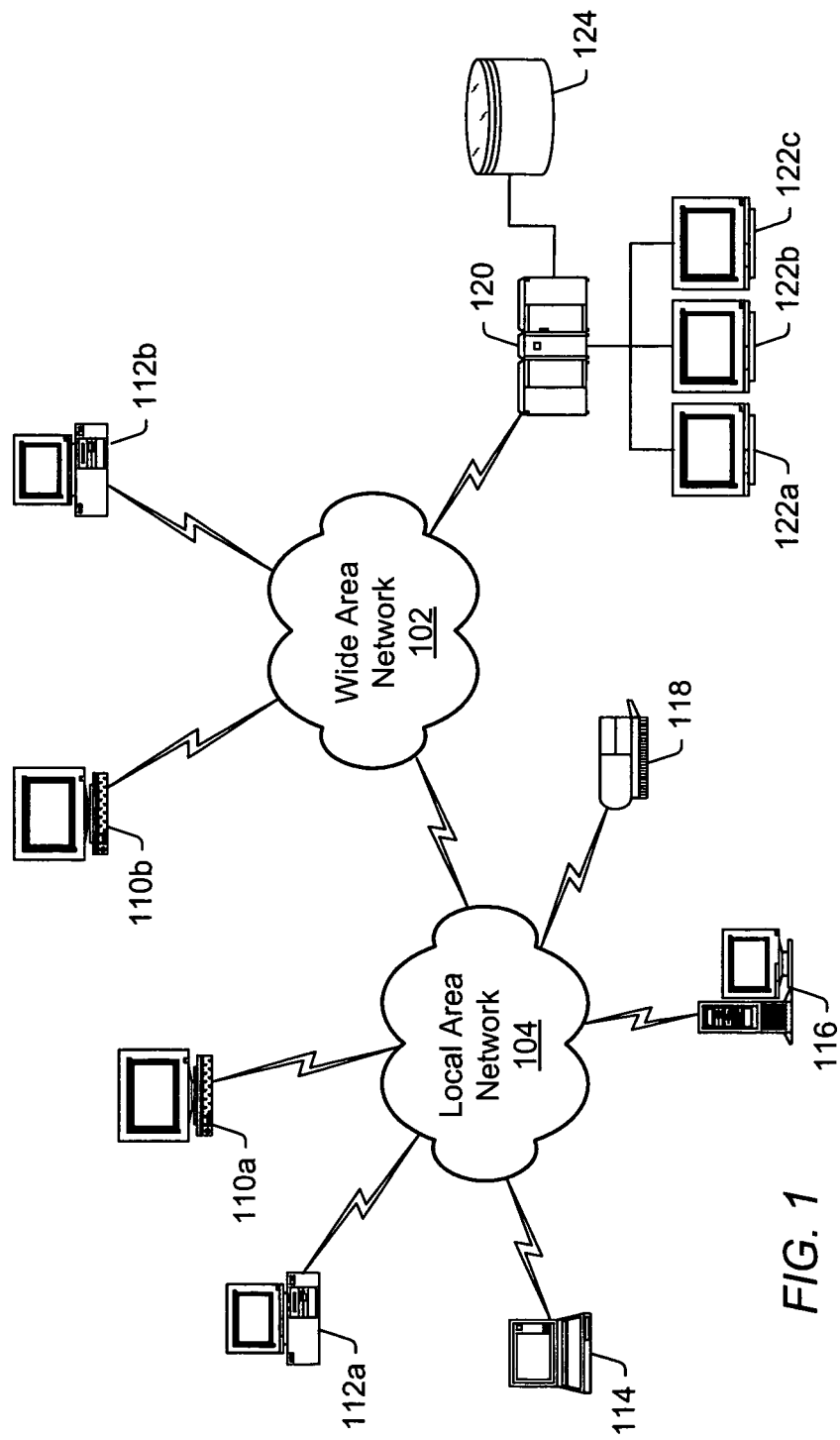
FIG. 1 illustrates an embodiment of a wide area network ("WAN").

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

In various embodiments, old flood maps (e.g., FEMA maps) may be compared to new flood maps to determine which areas of the flood map have changed. These changed areas may be correlated against a street map (or other map) to identify areas (e.g., parcels, streets, street segments and/or other groups of digital points) that are within changed areas of the flood map (and parcels, streets, street segments and/or other groups of digital points that are within unchanged areas of the flood map). In some embodiments, a Geographic Data Technology, Inc. (GDT) map database may be used to provide the street segments or other geographic area descriptions. Other map databases may also be used. The changed areas may also be analyzed to determine whether each area has had a change in status (e.g., from a high risk flood zone to a non-high risk flood zone or vice versa) or a change in zone within a status (e.g., from one flood zone to a different flood zone). In some embodiments, high risk flood zones may include zones with designations A, A1-A30, A99, AE, AH, AO, V, V1-V30, or VE and non-high risk flood zones may include zones with designations B, C, D, X, or X500. In addition, some coastal areas may receive designations as coastal areas under CBRA (Coastal Barrier Resources Act of 1982 (and/or its amendments)). These areas (which may be hatched on FEMA maps) are areas in which flood insurance may not be offered (usually very near the coast). Other zones and zone types are also possible. The information on the type of change (or no change) may be used to populate a database that includes geographic area descriptions (e.g., street segments). In some embodiments, detection of certain types of changes may initiate a manual comparison of the old and new flood maps. For example, street segments with a status change may be further analyzed to determine the extent of the status change (e.g., to determine which addresses on the street are included in the status change). Street segments with a zone change may also be further analyzed (e.g., to insure the accuracy of the determination and to determine which street segments are in the zone change). Companies and/or property owners may pay a provider of the service to notify them if an address or group of addresses has had a change in status or change in zone because of an updated FEMA map. For example, a look-up on each address may be performed on a database by determining a street segment identifier for each address and performing a look-up in the database on the information associated with that street segment. In some embodiments, information in the database may be stored by street segment (or other geographic area description). In some embodiments, information may be stored on a property-by-property basis (e.g., a range of addresses may be updated according to information on their corresponding street segments). In some embodiments, change detection may be performed on multiple flood maps (e.g., in a batch process). Change detection between the old maps and new maps may use computers and databases accessible over wide area networks ("WANs") and/or local area networks ("LANs").

FIG. 1 illustrates an embodiment of a WAN 102 and a LAN 104. WAN 102 may be a network that spans a relatively large geographical area. The Internet is an example of a WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more LANs 104 may be coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs. Each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices. For example, LAN 104 may include one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104. For example, workstation 110b and personal computer 112b may be connected to WAN 102. For example, WAN 102 may include computer systems that may be geographically remote and connected to each other through the Internet.

Figure 2:
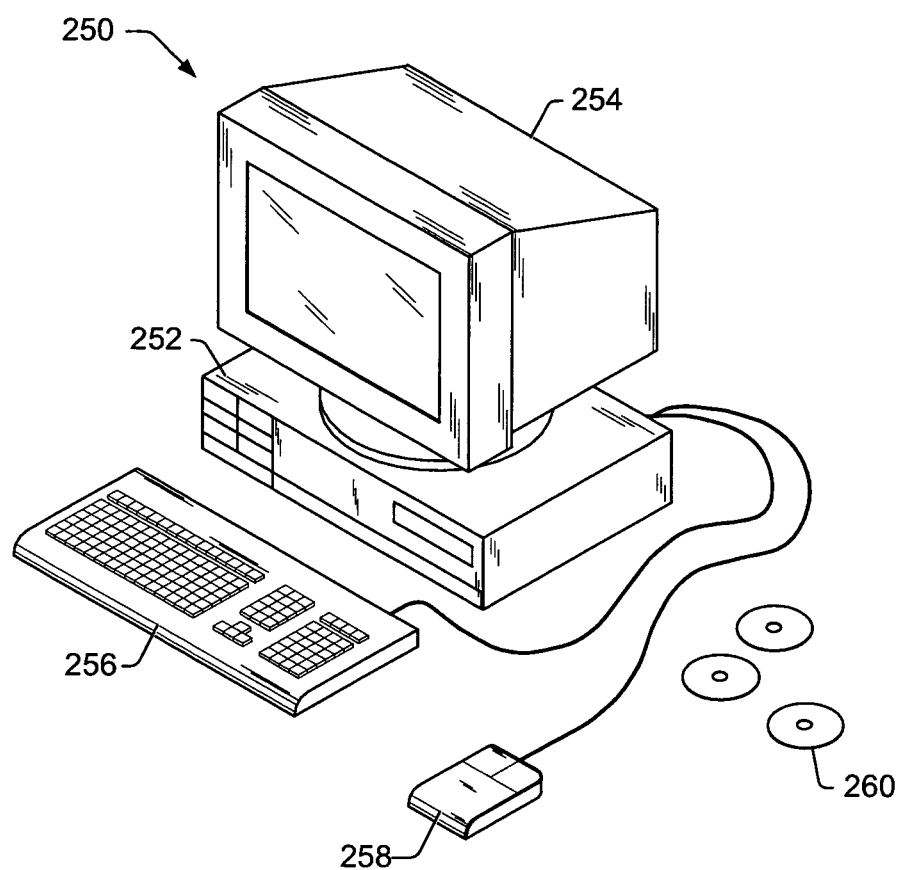
FIG. 2 illustrates an embodiment of computer system that may be suitable for implementing various embodiments of a system and method for change detection.

FIG. 2 illustrates an embodiment of computer system 250 that may be suitable for implementing various embodiments of a system and method for change detection. Each computer system 250 typically includes components such as CPU 252 with an associated memory medium such as CD-ROMs 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for change detection.

Computer system 250 may include a memory medium on which computer programs according to various embodiments may be stored. The term "memory medium" is intended to include an installation medium, e.g., floppy disks or CD-ROMs 260, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for change detection. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Figure 3A:
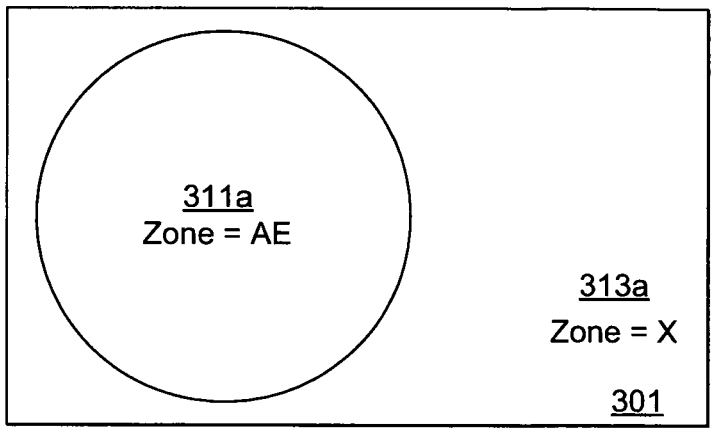
FIGS. 3a-f illustrate a series of maps showing the union process between an old and new flood map, according to an embodiment.
Figure 3B:
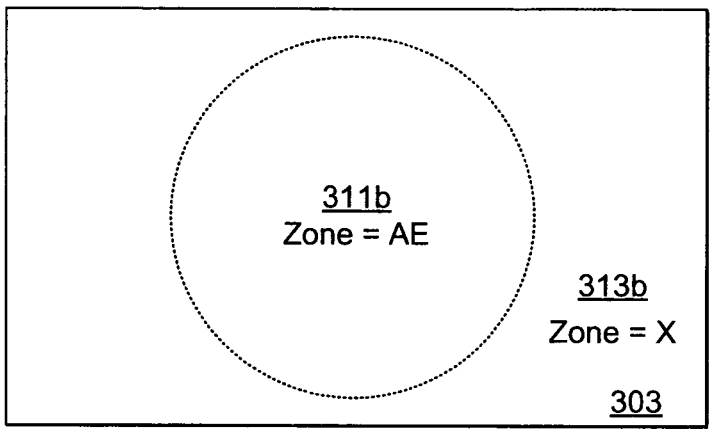

FIG. 3a illustrates a first map 301 (e.g., an old map) of a high risk flood zone 311a (e.g., zone="AE") and a non-high risk flood zone 313a (e.g., zone="X"). FIG. 3b may illustrate an updated second map 303 with an updated high-risk flood zone 311b (e.g., zone="AE") and non-high risk flood zone 313b (e.g., zone="X"). While several figures described herein illustrate various maps, as used herein, the term "map" is not restricted to displayable maps but is also meant to include other data descriptions including, but not limited to, databases (e.g., information may be maintained in a database for digital points in a geographical area without necessarily displaying the digital points in a spatial relationship). In addition, while several embodiments are described with street segments, they are also applicable with other geographic area descriptions (e.g., parcels, groups of digital points, etc.).

The updated high risk flood zone 311b may have moved with respect to the old high risk flood zone 311a shown in FIG. 3a. The area now in the non-high risk flood zone 313b may also have changed (because the high risk flood zone 311b is in a different location). In some embodiments, the first map and/or second map may be digitized (e.g., points on the map may be assigned attributes such as coordinates, status, zone, etc.). In some embodiments, the digitized map data may be put into a vector data form (e.g., designating the different areas) that may then be used by a spatial data engine (e.g., to perform the comparisons between maps). For example, in some embodiments, a geographical information system (GIS) by Environmental Systems Research Institute (ESRI) may be used to digitize and manage map data during the comparisons.

Figure 3C:
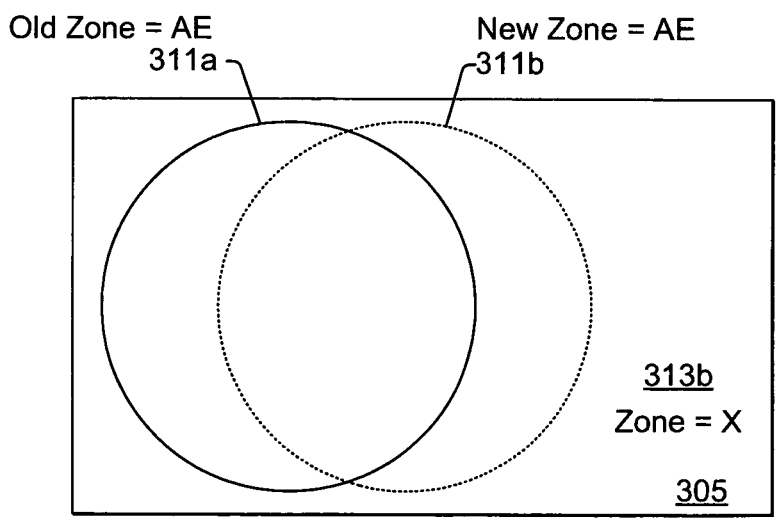

FIG. 3c illustrates a union map 305 of the old high risk flood zone 311a and the new high risk flood zone 311b (both high risk flood zones) and non-high risk flood zone 313b. The coordinates of the first map and updated second map may be aligned for the union. In some embodiments, the first map and second map may have outer boundaries located on the same coordinates and, therefore, may be aligned according to their outer boundaries. In some embodiments, specific coordinates may be identified on each map and aligned with each other during the overlapping of the maps (e.g., the coordinates for a landmark identified on each map may be used to align the maps). In some embodiments, the first map and second map may not be actually physically overlapped, but may be digitally overlapped (e.g., information on respective coordinates may be kept in a database). For example, the maps may be digitized and information about digitized points may be stored (e.g., old status of point, new status of point, geographical coordinates of point, etc.). In some embodiments, points on the map may need to be interpolated (e.g., if a map is to be compared to a map with a higher resolution). In some embodiments, the map data may also be scaled for alignment (e.g., a larger map may be scaled down to be correlated against a smaller map of the same region).

Figure 3D:
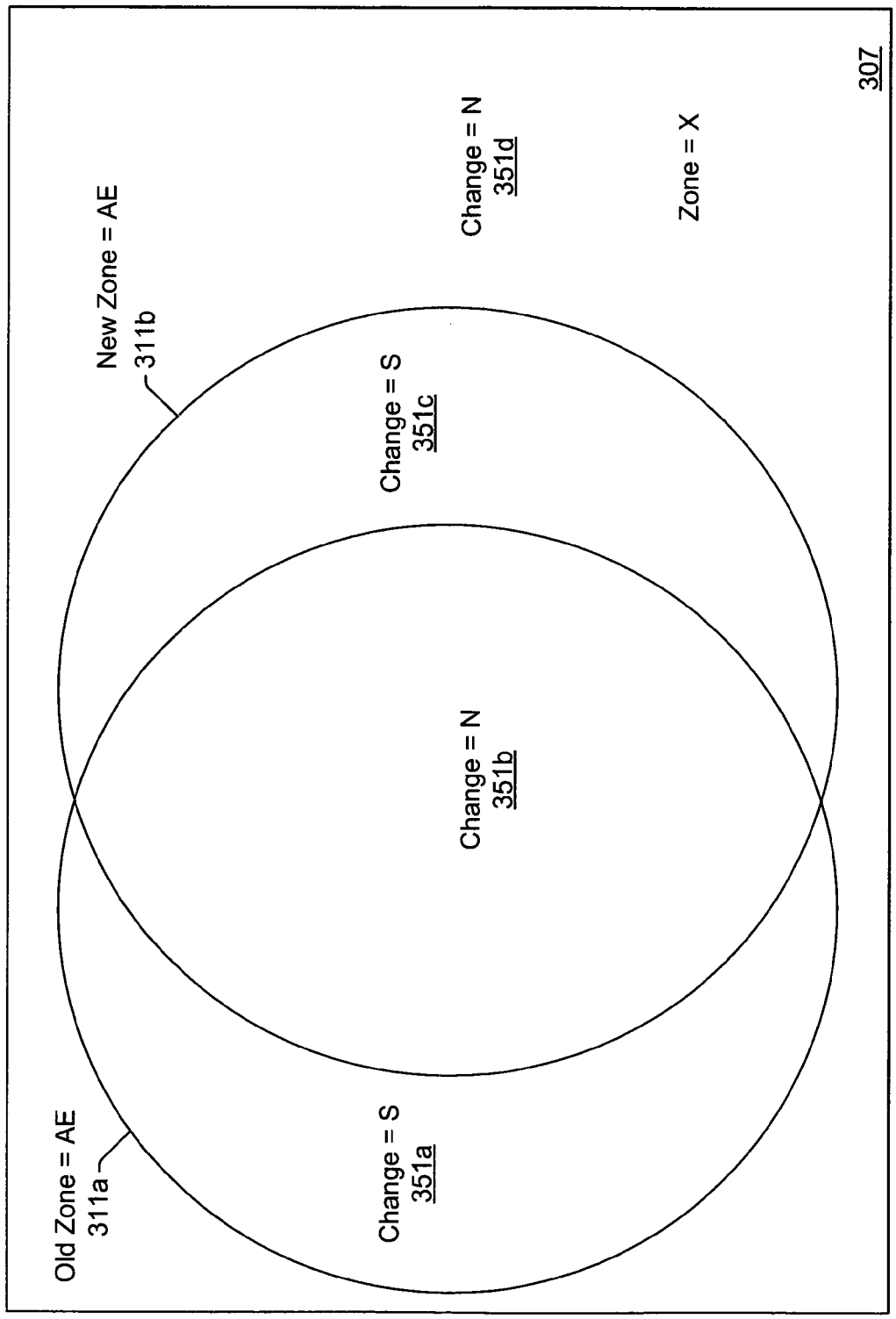

FIG. 3d illustrates a map 307 showing corresponding areas of change and no-change. Areas on the map may be defined according to areas of change (and/or no change). The boundaries of the overlapping old zones and new zones may be used to demarcate polygons circumscribing the areas of change and no change. As used herein, the term "demarcate" refers to defining and/or marking areas (e.g., by outlining in a polygon, using different types of shading, or using different designators in a database). The term "demarcate" as used herein is not meant to be restricted to a displayable element (e.g., a line) but is also meant to include, for example, maintaining identifiers in a database for different geographic area descriptions (e.g., a parcel or group of digital points on a map). Demarcated areas may include outlined areas (e.g., polygons), geocoded points (e.g., designated with latitude/longitude), and parcels. Other demarcated areas are also contemplated.

In some embodiments, a third flood map may be created which includes one or more demarcated areas based on the comparisons of the first flood map and the updated second flood map. In some embodiments, software such as GIS may be used to designate the demarcated polygons. In some embodiments, the areas may be designated by other methods. The demarcated areas may receive designators indicating whether the area has had a change in status, zone, and/or no change. For example, area 351b may be within both the old high risk flood zone 311a and the new high risk flood zone 311b. Therefore, area 351b did not change its status from the first map to the updated second map. In some embodiments, the area 351b may receive a designator to indicate that it has not had a change in status. For example, area 351b may be designated as a no change in status area (e.g., with a change designator: change type="N") to indicate the demarcated area type of area 351b. Other change designators are also contemplated to indicate demarcated area types. In some embodiments, a specific change designator may not be assigned. For example, information for each point on the first map, second map, and/or change map may be stored and the change type may be determined point by point (e.g., for all points or as needed). In some embodiments, instead of assigning the change designator (or in addition to) other methods of designating the areas are also possible.

As an additional example, area 351a may have originally been in high risk flood zone 311a, but may not be in the new high risk flood zone 311b. Therefore, the status of area 351a has changed (i.e., from a high risk flood zone to a non-high risk flood zone). Area 351a may be designated as a change in status area (e.g., receive a change designator change type="S") to indicate the demarcated area type of area 351a. Area 351c may have not originally been in high risk flood zone 311a, but may be in high risk flood zone 311b. Therefore, the status of area 351c has changed (i.e., from a non-high risk flood zone to a high risk flood zone). Area 351c may be designated as a change in status area (change type="S"). In addition, area 351d may be designated as a no change in status area (e.g., change type="N").

Figure 3E:
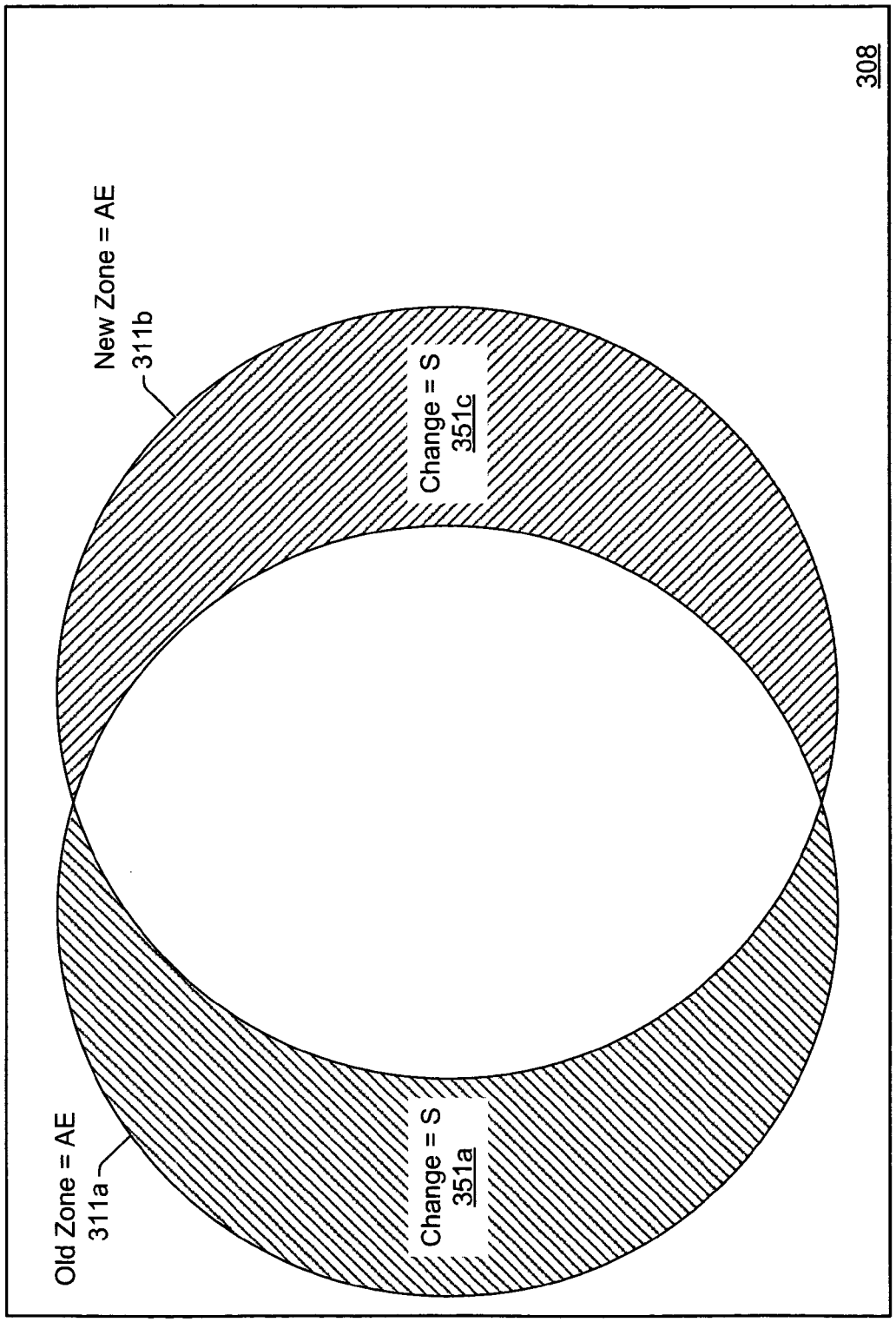

FIG. 3e illustrates a map 308 which illustrates only areas of change type="S". In some embodiments, areas with change type="N" may not be placed on third map (and/or may not be displayed). Shaded regions 351a and 351c may be shown as part of the third map because they are change type="S" areas.

In some embodiments, areas of change type="Z" may also be placed on the third map (or optionally not placed on the third map at the user's discretion).

Figure 3F:
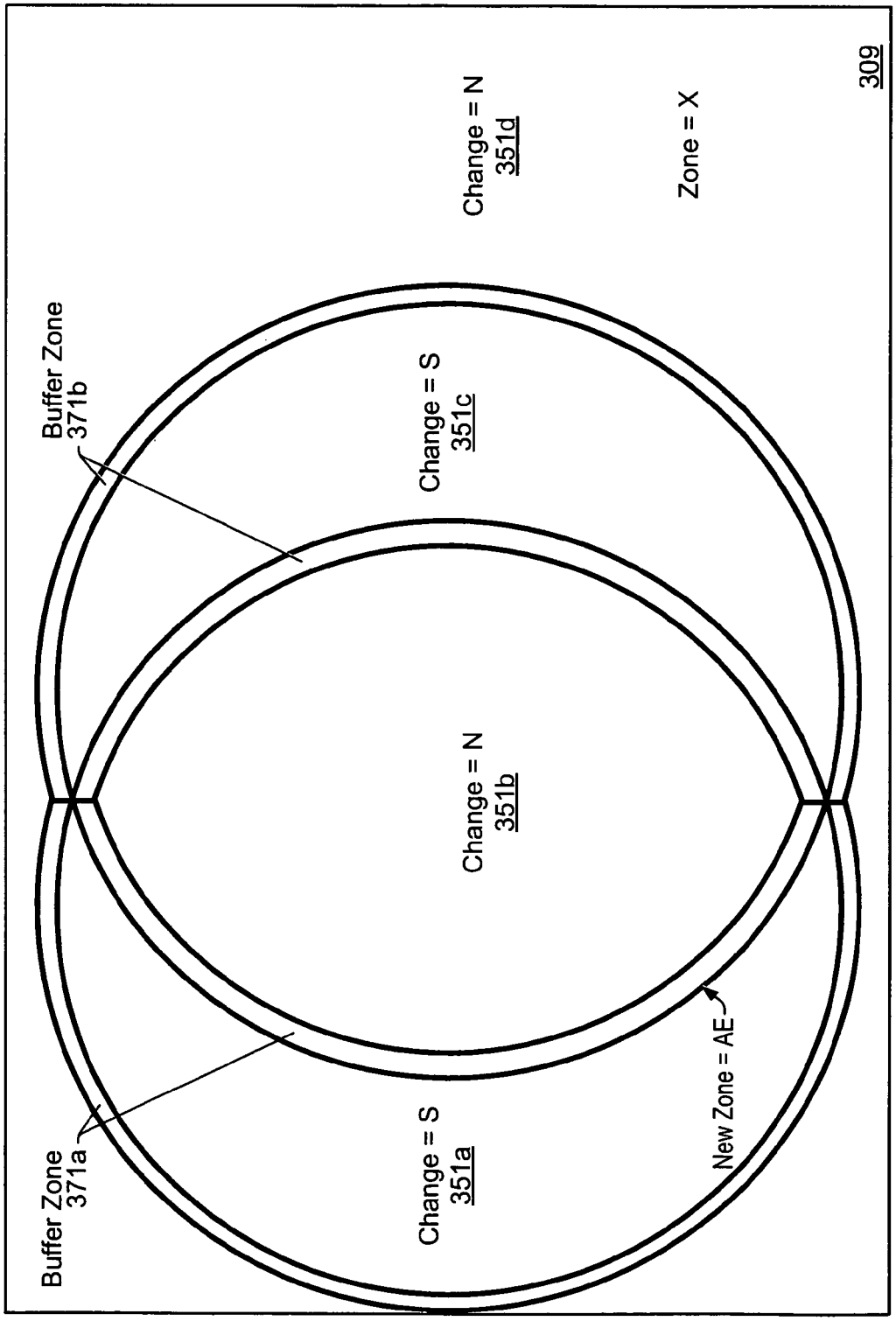

FIG. 3f illustrates a map 309 with buffer areas placed around the change in status areas, according to an embodiment. For example, buffer areas 371a and 371b may be placed around change in status areas 351a and 351c, respectively. Buffer areas may also be placed around other areas as well. These buffer areas may be treated as extensions of areas they are buffering during further analysis (e.g., these area may be treated as change in status areas until a human user manually inspects the areas). In some embodiments, the width of the buffer may be based on the accuracy of the flood maps alignment and/or the alignment between the flood maps and a street segment map. For example, if there is a lot of uncertainty about the alignment, a larger buffer area may be used. Alignment uncertainty may be measured, for example, according to the resolution of the maps (e.g., a finer resolution between the two maps may result in a smaller buffer area while, for example, a larger scale map (with less resolution) may result in a larger buffer area).

Figure 4A:
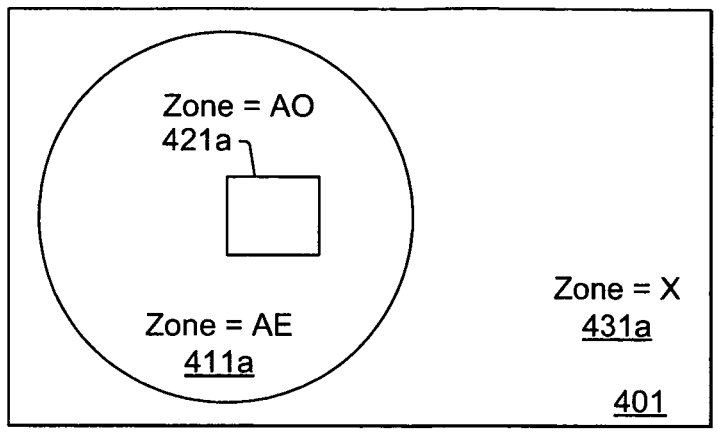
Figure 4B:
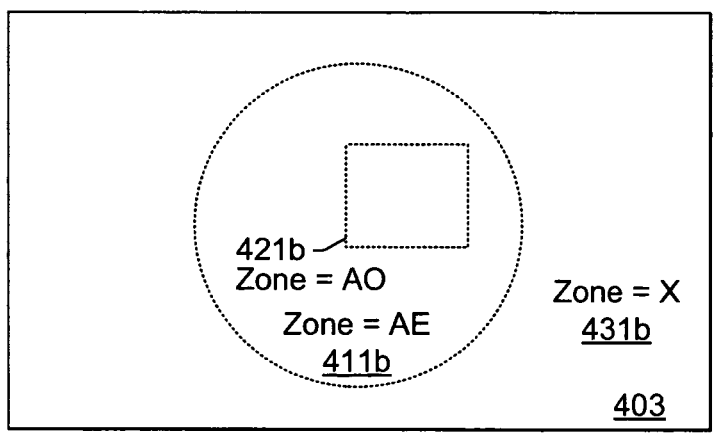
Figure 4C:
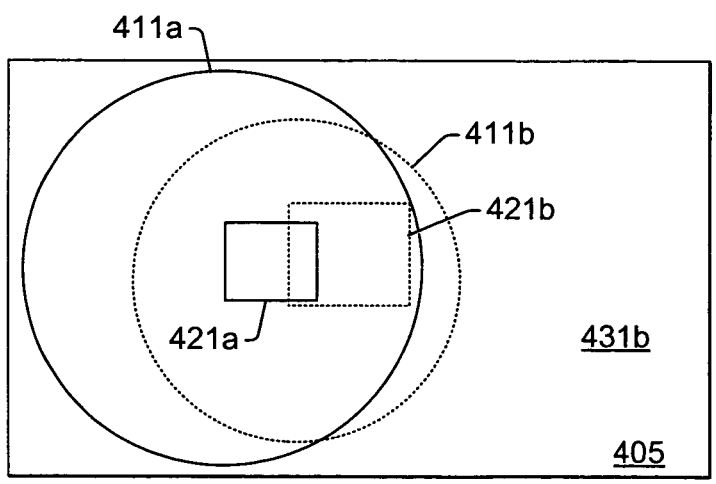
Figure 4D:
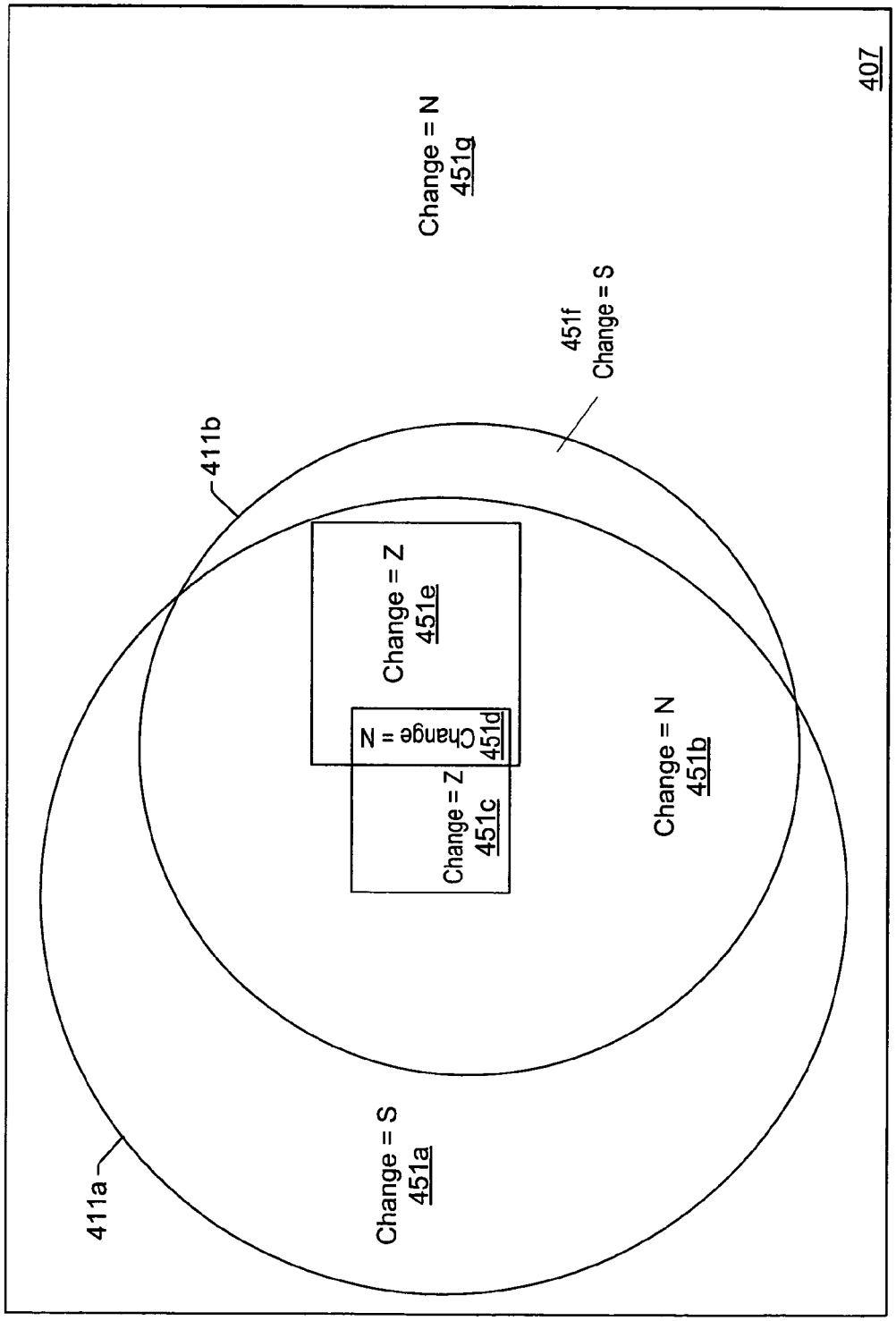

FIG. 4a illustrates a first map 401 of flood zone 411a (Zone AE), flood zone 421a (Zone AO), and flood zone 431a (Zone X). FIG. 4b illustrates an updated second map 403 with a moved and resized flood zone 411b, flood zone 421b, and flood zone 431b. Updated maps may also have new zones added and/or old zones removed. Other sources of zone changes are also possible. FIG. 4c illustrates a union map 405 of updated second map 403 overlaid on first map 401. FIG. 4d illustrates a change map 407 with corresponding areas of change and no change. Area 451a was in old flood zone 411a (Zone=AE), but is in the new flood zone 431b (Zone=X) on the second map. Therefore, area 451a may be designated as a change in status area (change type="S") because the change was from a high-risk flood zone to a non-high risk flood zone. Area 451b is in the old flood zone 411a and the updated flood zone 411b and, therefore, may be designated as a no change in status area (change type="N") because both the old and new flood zones are high-risk flood zones. Area 451f was in the old non-high risk flood zone 431a, but is in the updated high-risk flood zone 411b and, therefore, may be designated as a change in status area (change type="S"). Area 451g is in the old non-high risk flood zone 431a and the updated non-high risk flood zone 431b (change type="N").

Area 451c is in old flood zone 421a (zone=AO), but on the updated map, area 451c is in flood zone 411b (zone=AE). Because it is in a high-risk flood zone in both the old flood map 401 and the updated flood map 403, it may have the same status. However, because its zone has changed (from zone AO to zone AE), it may be designated as a change in zone area (change type="Z"). Area 451d is in old high-risk flood zone 421a and updated high-risk flood zone 421b (it may therefore be designated change type="N"). Area 451e was in old flood zone 411a, but on the updated map, area 451e is in flood zone 421b. Area 451e, therefore, maintains its status as a high-risk flood zone, but has had a zone change (from AE to AO). Area 451e may be designated a change in zone area (change type="Z"). Area 451f may be a change in status area (change type="S") and area 451g may be a no change in status area (change type="N").

Figure 4E:
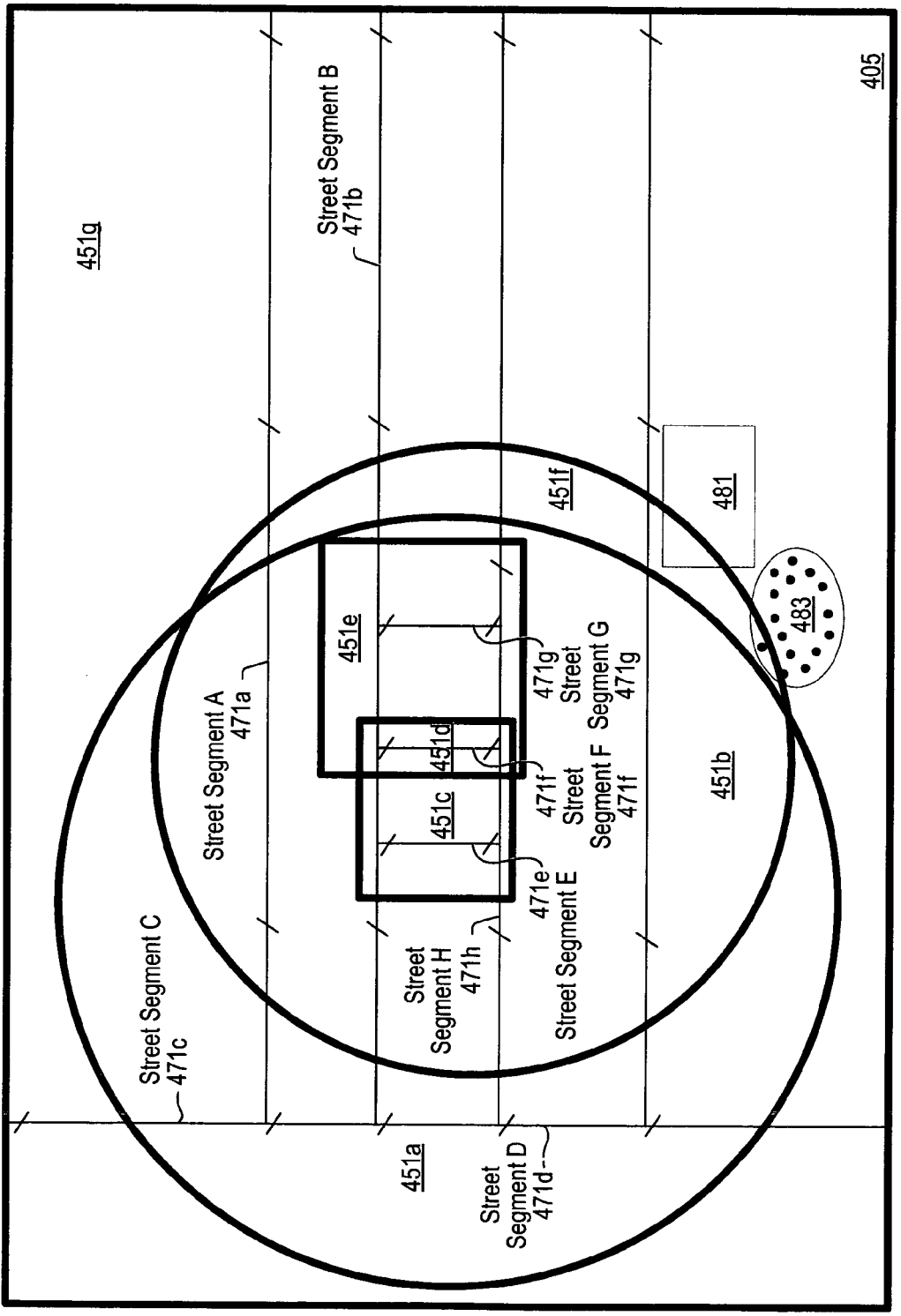

In some embodiments, a street map (e.g., with geographic area descriptions such as street segments, parcels, or groups of digital points) may be overlaid on the change map 407. In some embodiments, the street map may be digitized to overlay on the change map. In some embodiments, the street map may not be overlaid but may be aligned with the change map data in a database (or other format). In the embodiment shown in FIG. 4e, the street segments are shown between "/"s on the map. The street segments may be parsed out of the provided streets or may be provided in segments from the map database. Other street segmenting is also possible. Street segments 471 may be classified according to the areas they occupy. For example, street segment D 471d is in area 451a and therefore may be assigned an indicator of change type="S". Assigning an indicator as used herein refers to generally indicating a change type and is not meant to be limited to the specific indictors provided herein. For example, other labels, numbers, and qualifiers may also be used to indicate a change type associated with a geographic area description (e.g., displayed map labels or numbers indicative of the change type stored in a database).

As another example, if a street segment passes through a change in status area (change type="S"), then the street segment may be assigned an indicator change type="S" (e.g., street segment C 471c passes through area 451a (a change type="S" area) and area 451g (a change type="N" area)). In this example, the change type="S" may have priority and, therefore, street segment C 471c may be assigned an indicator change type="S". As yet another example, street segment A 471a passes through three areas (451b, 451f, and 451g). Even though two of the three areas may be change type="N" areas (451b and 451g), the change type="S" area (451f) may prioritize the identifier for street segment A 471a as a change type="S" area. In some embodiments, other geographical area descriptions may be assigned an indicator. For example, a parcel 481 may be assigned an indicator change type="S" because part of the parcel 481 passes through a change type="S" polygon. As another example, a group of digital points 483 (in an elliptical shape) may also be assigned an indicator change type="S" because part of the group of digital points 483 passes through a change type="S" polygon. As another example, a geocoded point (e.g., with a specific latitude/longitude designation) may also be assigned a change type="S" or change type="Z".

In some embodiments, a street segment in a zone change area may be assigned an indicator of change type="Z". For example, street segment E 471e and street segment G 471g are in areas 451c and 451e, respectively (both change in zone areas). Street segment E 471e and street segment G 471g may, therefore, be assigned an indicator of change type="Z". Street segment H 471h crosses through 4 areas (451b, 451c, 451d, and 451e). Areas 451b and 451d are designated change type="N" areas. Areas 451c and 451e are designated change type="Z" areas. In some embodiments, because the street segment H 471h crosses through a change type="Z" area (which may have priority over change type="N" areas), the street segment may be assigned an indicator change type="Z". Street segment B 471b and street segment F 471f may be in change type="N" areas (451g and 451d, respectively) and, therefore, these street segments may be assigned an indicator change type="N".

In some embodiments, street segments (or other geographic area descriptions) in a change in status area (e.g., with identifiers change type="S") may receive closer scrutiny. For example, these segments may be manually inspected by a human user. A human user may inspect the old and/or new flood map to determine if the street segment was properly assigned the correct indicator. A human user may also analyze the street segments to determine which addresses on the street segment should be assigned a change in status indicator. Users may also look at additional addresses around designated street segments to determine if other addresses should be similarly assigned a change in status indicator and/or change in zone indicator. Streets with identifiers change type="Z" may also receive manual inspection. Street segments with identifiers change type="N" may be automatically processed (in some embodiments, they may be manually inspected as well). In some embodiments, street segments with identifiers change type="S" or change type="Z" may also be automatically processed.

As seen in FIG. 4f, a database 488 (e.g., an Oracle database) of geographic area description entries 486 (e.g., street segment entries) may be maintained with database entries for the geographic area descriptions updated according to the determined change types 484 (a database 488 may also be maintained for other geographic area descriptions, e.g., by parcel). In some embodiments, the database 488 may not designate specific addresses, but may instead maintain information with respect to specific street segments. In some embodiments, each street segment may have a geographic area description identifier (e.g., GDT identifier (GDTID) column 482). The data entries for the corresponding geographic area descriptions in the database 488 may be individually (e.g., according to their GDTID) updated with, for example, the change type determined for an area through which the geographic area description passes (e.g., through which the street segment passes). In some embodiments, the identifier updates may be prioritized (for example, street segment data updated to indicate change type="S" if the street segment passes through a change in status area; indicate a change type="Z" if the street segment does not pass through a change in status area but does pass through a change in zone area; and indicate a change type="N" if it passes through neither a change in status area nor a change in zone area.)

In some embodiments, a range of addresses corresponding to each street segment (or geographic area description) may be updated in a database. In some embodiments, the range of addresses (e.g., assigned to a specific GDTID) may be updated with a new zone identifier (e.g., zone=AE) and/or a status change identifier (e.g., change type="S"). Other information may also be updated for the range of addresses. In some embodiments, instead of updating a database, results of the comparison may be put into a text document accessible to a user. In some embodiments, the results may be used by other programs.

Figure 5:
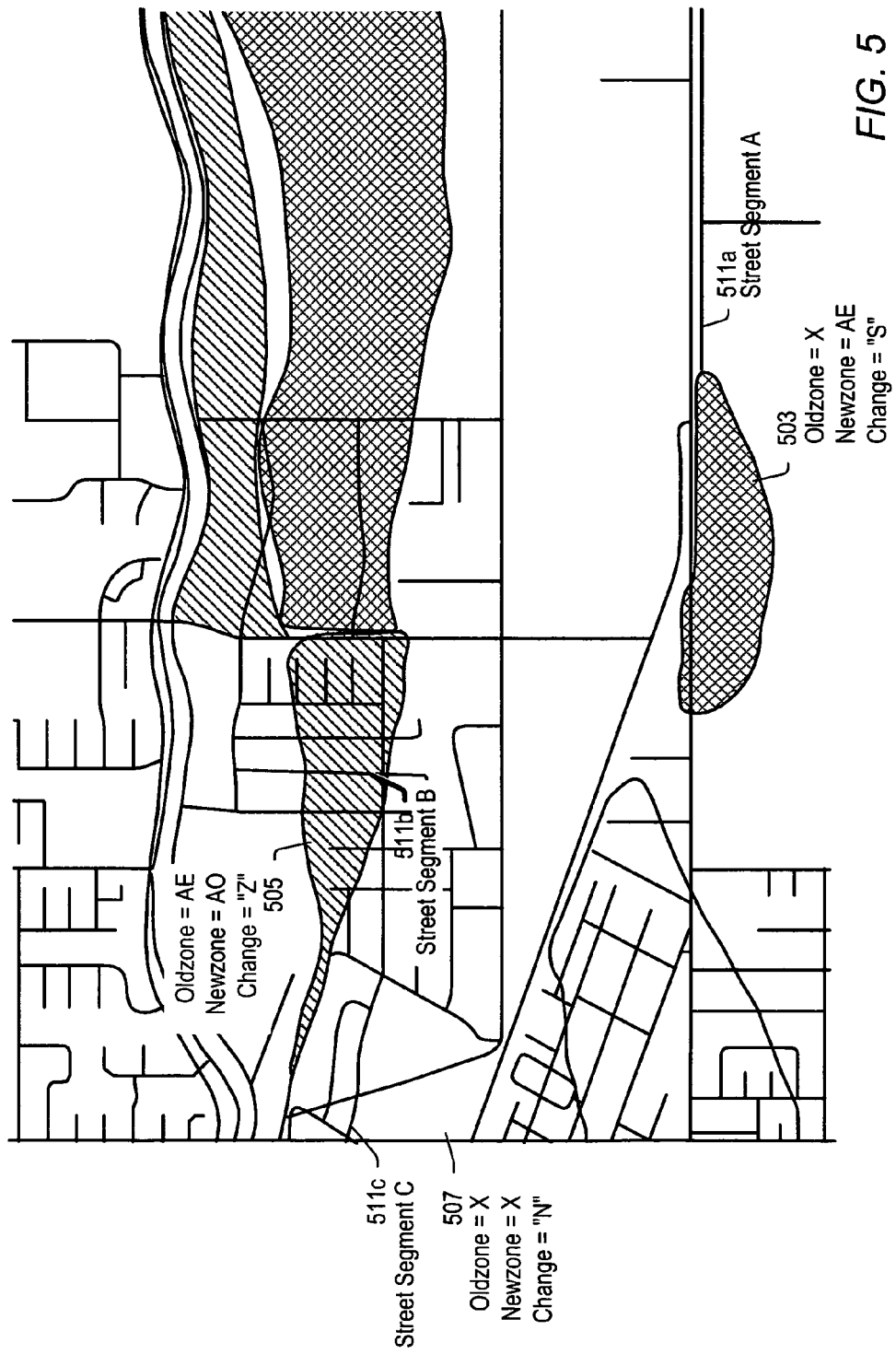
FIG. 5 illustrates a change detected map, according to an embodiment.

FIG. 5 illustrates a change detected map (e.g., a third map), according to an embodiment. After a map union and zone comparison, a third map may be generated and displayed indicating different types of changes. Different types of information may be maintained and displayed for the different areas on the map. In some embodiments, Newzone, Oldzone, and change type variables may be stored and/or displayed for each area (additional information and/or different variable names may also be used). Similar information (or a subset of the information) may also be stored for each street segment or other geographic area description.

In the example shown, area 503 may have been zone X on an old map (Oldzone=X) and may be in a new zone on the new map (Newzone=AE). Because the Oldzone and Newzone have a different status, the change for the area 503 may be noted as change type="S". For example, street segment A 511a may be assigned an indicator of change type="S" because at least part of the segment is within area 503 (with change type="S"). As another example, area 505 may have been zone AE on an old map (Oldzone=AE) and may be in a new zone on the new map (Newzone=AO). Because the Oldzone and Newzone are different zones within the same status, the change for the area 505 may be noted as change type="Z". Street segment B 511b may be assigned an indicator change type="Z" because at least part of the segment is within area 505 (with change type="Z"). In some embodiments, street segments A 511a and B 511b may receive a manual review (e.g., to determine which parts of the street segments are in area 503 and 505, respectively) or may be processed automatically.

As yet another example, area 507 may have been zone X on an old map (Oldzone=X) and may be in the same zone on the new map (Newzone=X). Because the Oldzone and Newzone are the same, the change for the area 507 may be noted as change type="N". Street segment C 511c may be assigned an indicator change type="N" because the entire segment is within area 507 (with change type="N"). In some embodiments, street segment C 511c may be automatically processed (e.g., a database entry for addresses on street segment 511c may be automatically updated to indicate no change in status.)

Figure 6:
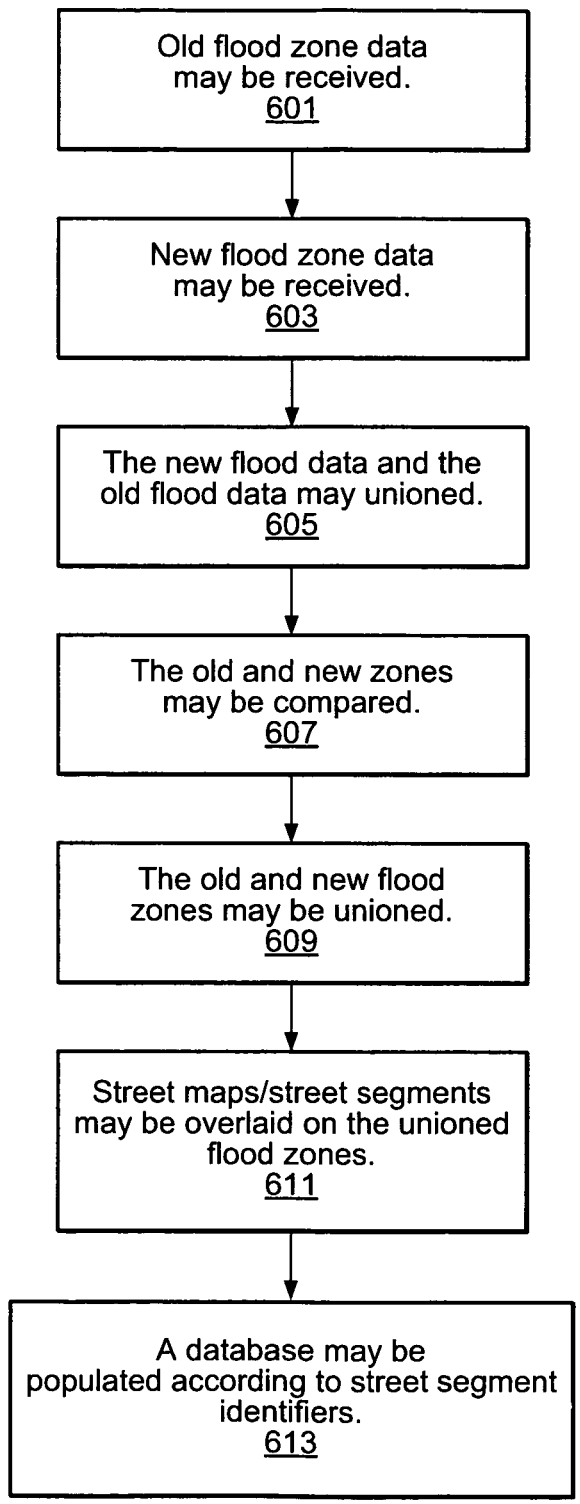
FIG. 6 illustrates a method for a change detection process, according to an embodiment.

FIG. 6 illustrates a method for a change detection process, according to an embodiment. It should be noted that in various embodiments of the methods described below, one or more of the elements described may be performed concurrently, in a different order than shown, or may be omitted entirely. Other additional elements may also be performed as desired.

Figure 7A:
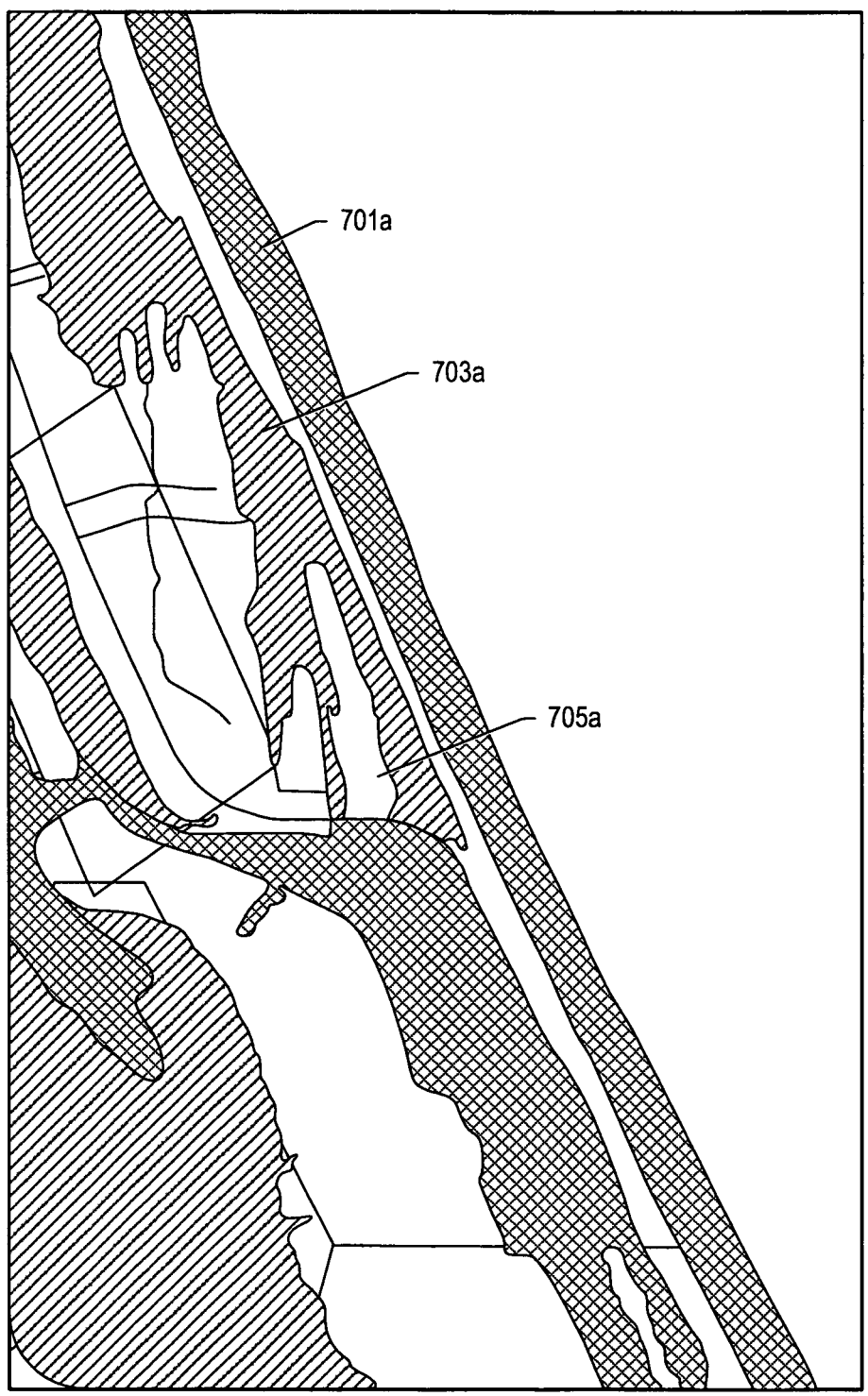
FIGS. 7a-g illustrate a series of maps used through the change detection process, according to an embodiment.
Figure 7B:
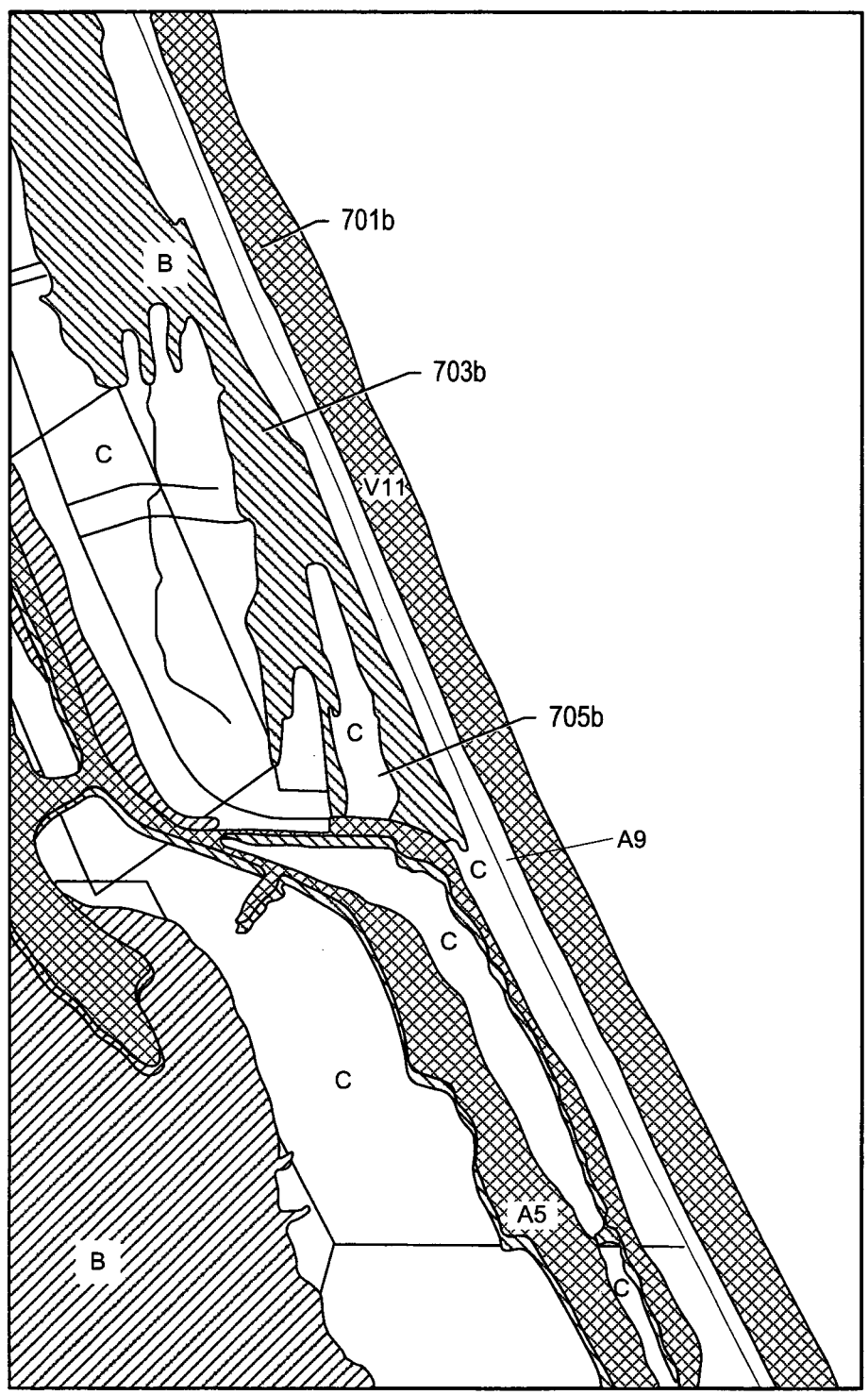

At 601, old flood zone data may be received. Old flood zone data may include previous FEMA maps with the locations of previous flood zones. For example, FIG. 7a illustrates an example of a FEMA map with old zone data (e.g., for zones 701a, 703a, and 705a). The old flood zone data may be scanned into the system or received digitally. In some embodiments, the old flood zone data may be received and digitized (e.g., assigning digital values to areas on the maps according to, e.g., their coordinates and flood zone). FIG. 7b illustrates an example of a digitized flood zone map with digitized flood zones (e.g., with zones indicated by designators "V11" 701b, "B" 703b, "C" 705b, etc.). In some embodiments, each continuous zone on the old FEMA map may be demarcated in a polygon (with different zones in different polygons). For example, the border between different zones may be a side shared by two polygons demarcating the different zones.

Figure 7C:
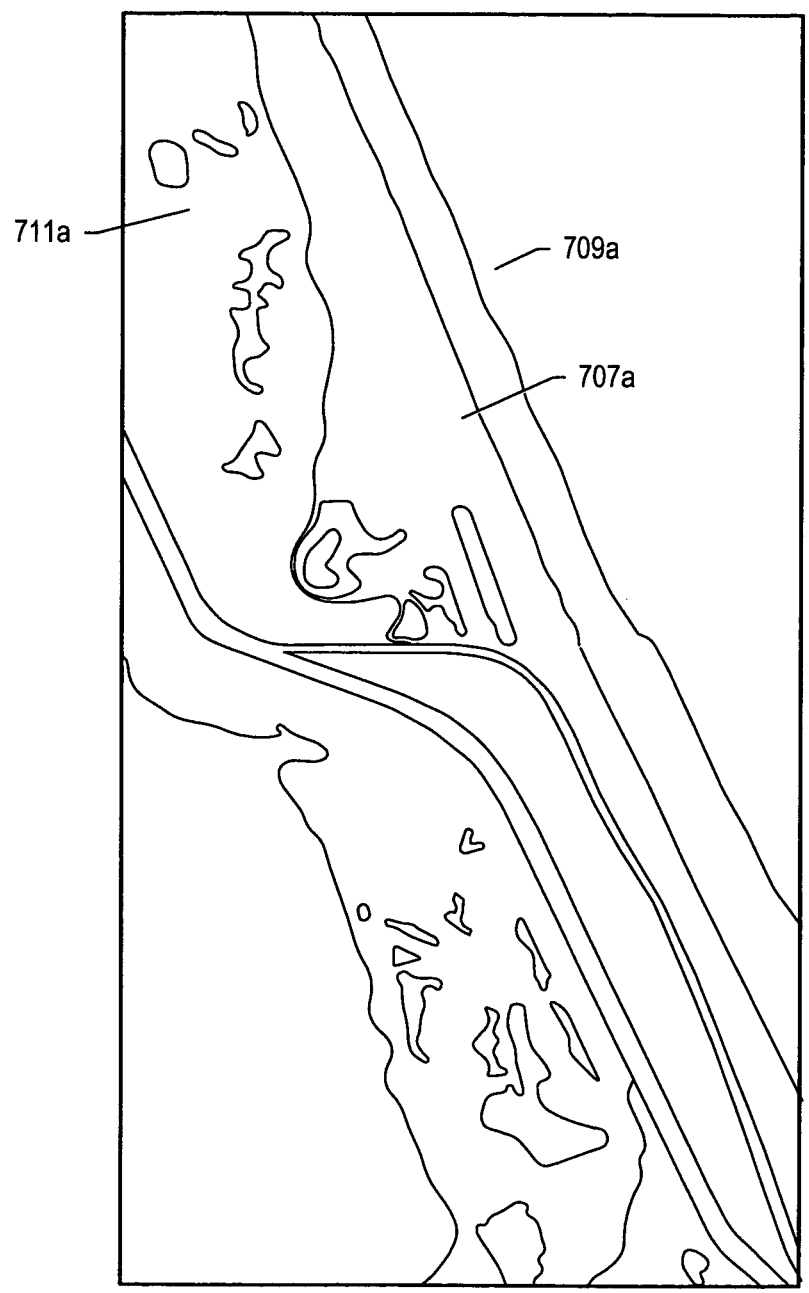
Figure 7D:
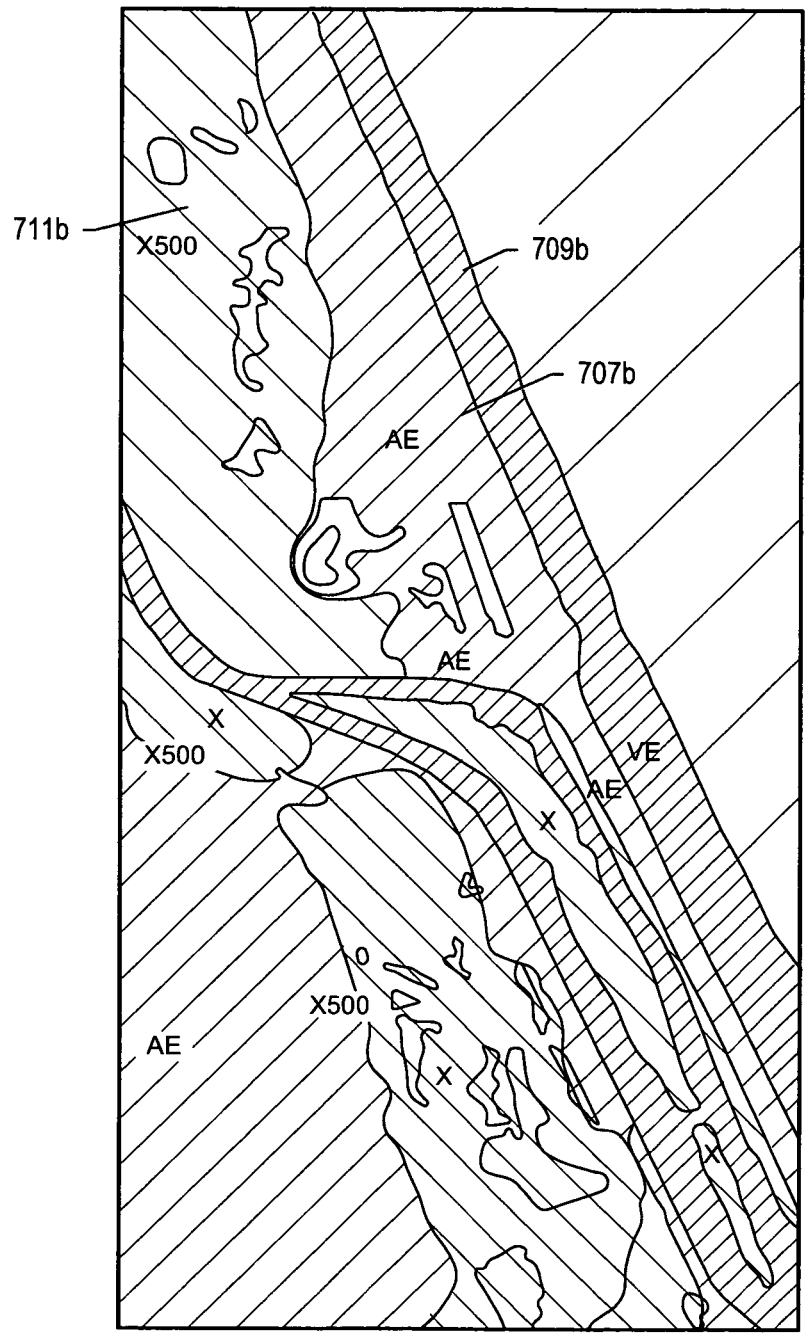

At 603, new flood zone data may be received. For example, new flood zone data may include FEMA maps with the locations of updated flood zones. FIG. 7c illustrates possible FEMA maps with new flood zone data (e.g., for zones 707a, 709a, and 711a). The new flood zone data may also be scanned into the system or received digitally. In some embodiments, data may originate from a FIRM (Flood Insurance Rate Map) or FEMA DFIRM (Digital Flood Insurance Rate Map). These maps may include digital data. Other types of maps and data types are also contemplated. FIG. 7d illustrates an embodiment of a digitized new flood zone data map (e.g., with zones indicated by designators "AE" 707b, "YE" 709b, "X500" 711b, etc.). In some embodiments, each continuous zone on the new FEMA map may be demarcated in a polygon (with different zones in different polygons). In some embodiments, the border between different zones may be a side shared by two polygons demarcating the different zones.

At 605, the new flood data and the old flood data may be unioned. For example, the new flood data and old flood data may be digitized and overlaid on each other. In some embodiments, the data may be coordinated to align data on one map with corresponding data (e.g., in the same region) of the other map. In some embodiments, the maps may not be physically overlaid, but may have digital data from one region of a map coordinated to digital data of the same region on the other map (e.g., in database form). In some embodiments, data may be scaled and/or interpolated (e.g., if the digital resolution of one map is less than the digital resolution of the map it is being compared to). The characteristics for the new area may be determined based on the characteristics of the area in the old map and the new map.

At 607, the old and new zones may be compared. For example, areas of no change between the maps, change in zone only, and change in status may be designated by comparing the old and new map zones. An area that has not had a change in status or zone (e.g., from zone=X to zone=X) between maps may be separated into a polygon (and designated in a no-change area). An area that has had a change in zone, but not status, (e.g., from zone=AE to zone=A0) may be separated into a separate polygon (and designated a zone change area). An area that has had a change in status (e.g., from zone=AE to zone=X) may be separated into yet another polygon (and designated a change in status). Polygons may be defined around areas of change or no change between the old and new maps. The areas may also receive designators (as defined above). The areas may also receive designators for zones and/or status on the old map and the new maps (e.g., see FIG. 5).

In some embodiments, old and new zones may be defined according to base flood elevations (BFEs), other flood elevations lines (e.g., the 500-year flood elevation line) and/or the boundaries associated with the BFEs and flood elevation lines. The areas of no change between the maps, change in zone only, and change in status may be designated by comparing the changes between, for example, BFEs between the first flood map and the second flood map. For example, the new BFEs on the second flood map may indicate that an area of the second flood map is no longer within a 100-year flood elevation (as defined by BFEs) and, therefore, the zone and/or status designation of that area may have changed. In some embodiments, the change may be reflected in a polygon demarcating the changed area. The change in BFEs and/or other flood elevation lines may also be indicated and/or stored relative to the polygon.

Figure 7E:
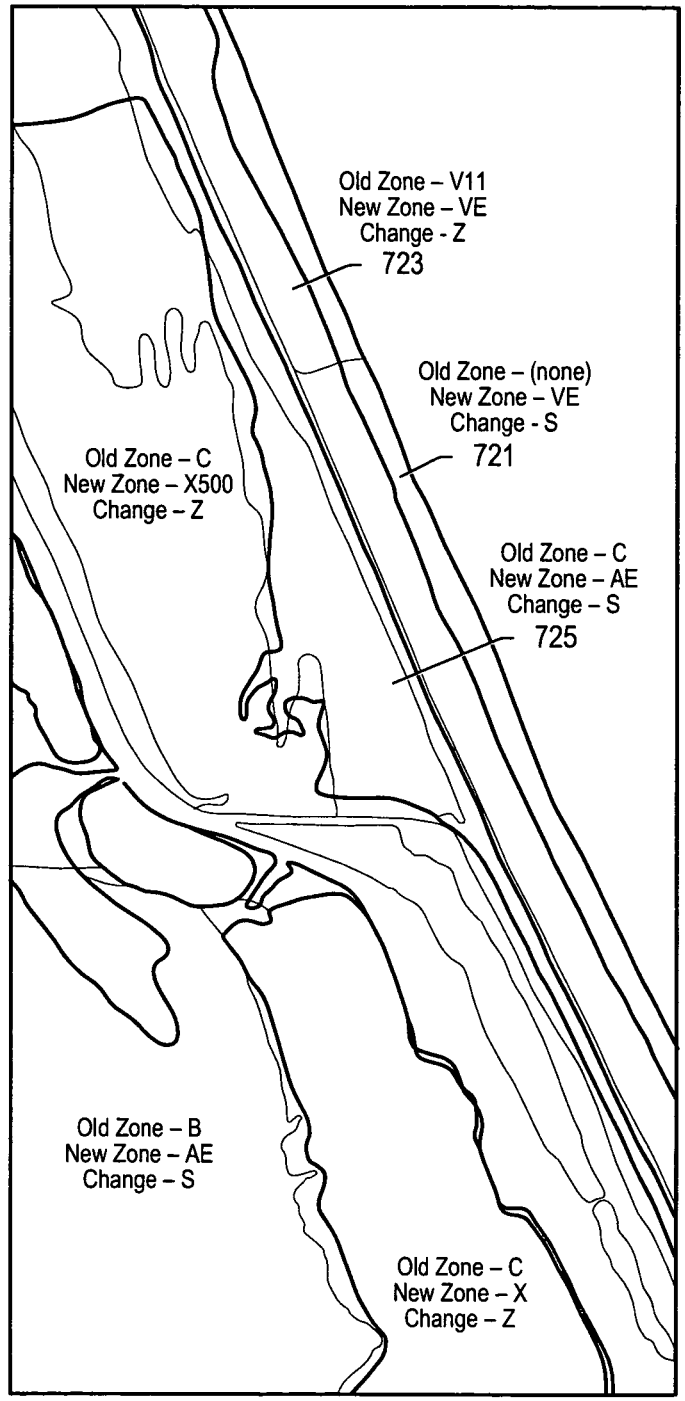

At 609, the old and new flood zones may be unioned. In some embodiments, polygons from the old map may be combined with polygons from the new map. Each area in the combined map bounded by polygon sides may be treated as a new polygon. For example, a new area may be created when a new polygon from the new map cuts through an old polygon from an old map when the two maps are overlaid. New polygons may be created for new regions that do not correspond with an old region (e.g., see FIGS. 3a-e and FIGS. 4a-4d). In some embodiments, the separated polygons may be indicated on a single map (or, for example, in a single database using designators next to corresponding street segments). For example, as seen in FIG. 7e, a FEMA map with old flood zones and a FEMA map with new flood zones may be digitized and corresponding polygons of the digitized maps may be unioned by comparing the zones for each polygon and providing a new polygon with a designator indicative of the change or lack of change of the corresponding old and new zones. The polygons may be assigned various values (which may be displayed). For example, as seen in FIG. 7e, polygon 721 has old zone="none", new zone="VE", and change type="S". Polygon 723 has old zone="V11", new zone="VE", and change type="Z". Polygon 725 has old zone="C", new zone="AE", and change type="S". In some embodiments, only polygons with change type="S" or "Z" may be displayed. In some embodiments, these polygons may receive a manual inspection.

Figure 7F:
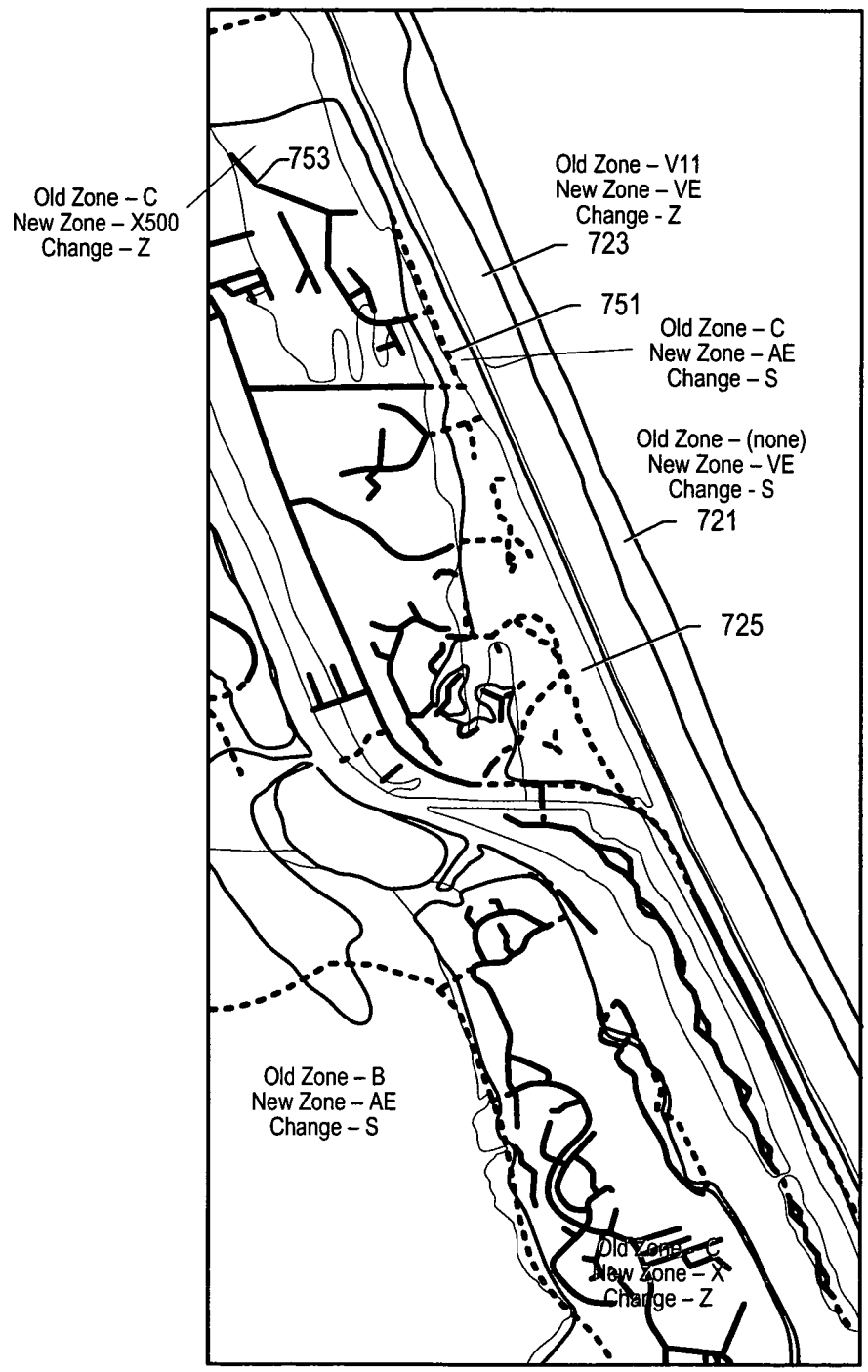

At 611, street maps/street segments (or other geographic area descriptions) may be overlaid on the unioned flood zones. For example, GDT streets may be overlaid on the unioned flood zones. As seen in FIG. 7f when the street segments are overlaid or in some other way associated with the mapped zones, the street segments (or other geographic area descriptions) may be assigned indicators according to the change types of the polygons they cross.

For example, if any part of the street segment crosses a change type="S" polygon, the street segment may be assigned an indicator change type="S" (e.g., street segment 751). If the street segment does not cross a change type="S" polygon, but does cross a change type="Z" polygon, it may be assigned an indicator change type="Z" (e.g., street segment 753). If the street segment does not cross a change type="S" polygon or a change type="Z" polygon, but is in a change type="N" polygon, it may be assigned an indicator change type="N".

In some embodiments, each street segment may initially be assigned an indicator change type="N" and then updated in a prioritized order. For example, if part of the street segment (or other geographic area description) crosses a change type="Z" polygon, the street segment may be assigned an indicator change type="Z". Then, if the street segment crosses a change type="S" polygon, the street segment may be assigned an indicator change type="S". This ordering may allow change type="S" to overwrite change type="Z" as appropriate. For example, if a street segment passes through a change type="S" polygon, it may have also passed through a change type="Z" polygon. However, the change type="S" identifier may need to be prioritized over the change type="Z" identifier (e.g., in order to provide closer analysis to street segments that pass through change type="S" polygons). In some embodiments, a different priority may be used.

In some embodiments, the street segments (or other geographic area descriptions) may be displayed according to indicator type (e.g., change type="S" street segments may be displayed red and change type="Z" street segments and change type="N" street segments may be displayed green). Other ways of displaying the street segments (or other geographic area descriptions) are also possible (e.g., using solid lines for change type="S" street segments and dashed lines for change type="Z" or "N" street segments).

At 613, a database may be populated according to street segment (or other geographic area description) identifiers. In some embodiments, the street segment identifiers may be populated in a prioritized order. For example, the no change identifiers may be populated first. Second, the zone change identifiers may be populated. Finally, the status change identifiers may be populated. In this manner, a street segment passing through a no change polygon and a status change polygon may be populated as a no change street segment on a first pass, but then re-designated as a change in status street segment on the third pass. In some embodiments, street segments with change type="S" may receive a manual inspection prior to being populated to the database. In some embodiments, manual inspections may be done for addresses on a street segment="S" that is looked up in the database. In addition to change type="S", other change types (including "Z" and "N") may also be manually inspected.

Figure 7G:
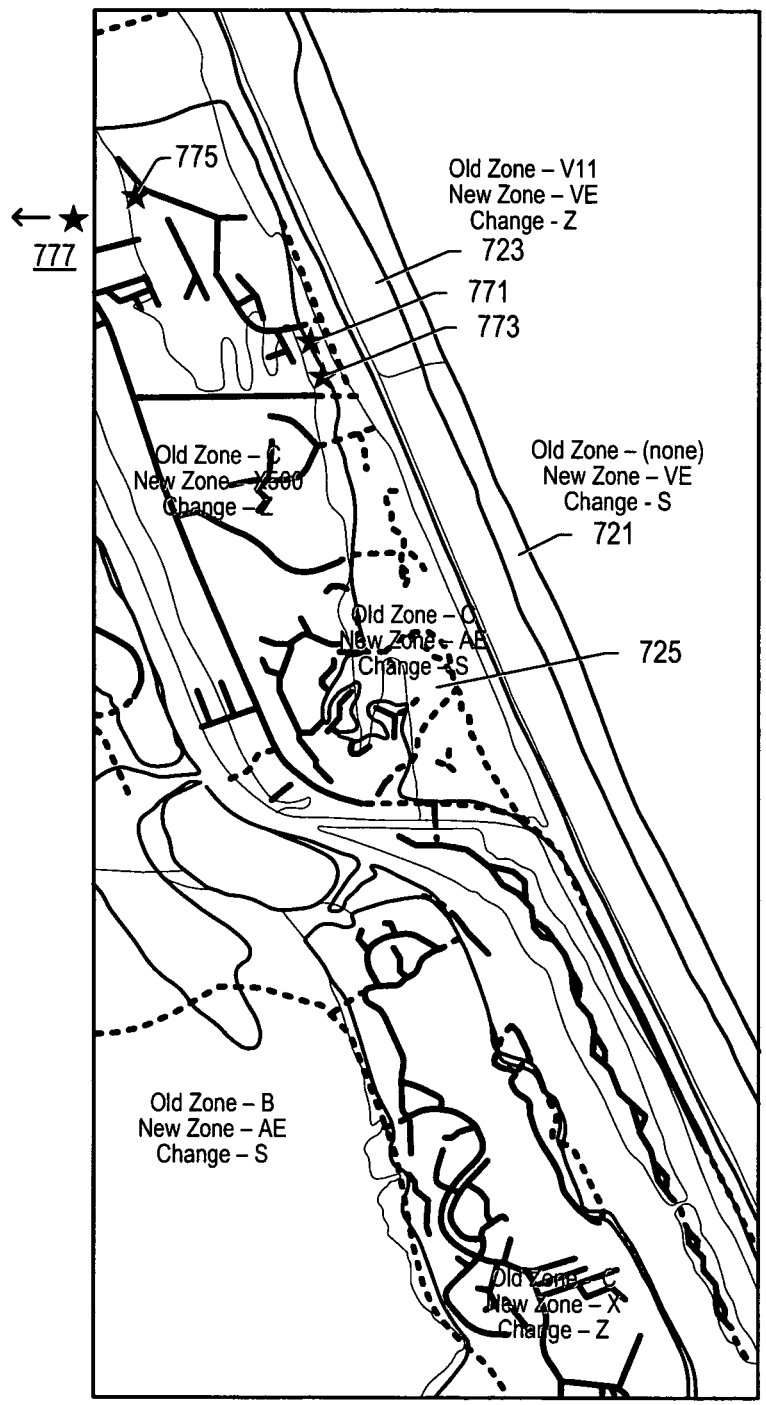

In some embodiments, addresses that need to be evaluated (e.g., to determine the current change status for the address or the current flood zone designation for the address) may be indicated on the map (e.g., see stars 771, 773, and 775 in FIG. 7g). In some embodiments, if there are additional addresses in a displayed region that need change status classification (e.g., through manual inspection), a screen indicator (e.g., screen indicator 777) may be displayed indicating a nearby address. This may allow a user to finish nearby manual inspections. In some embodiments, the user may classify (e.g., automatically or through manual inspection of the change detected flood maps) multiple addresses at the same time. For example, the user may classify addresses 771 and 773 as change type="S" addresses.

While several embodiments are described using street segments, it is to be understood that these embodiments also apply to using other geographic area descriptions. For example, instead of analyzing which demarcated areas are associated with a street segment, an analysis may include determining which demarcated areas are associated with specific parcels (e.g., corresponding to specific addresses) or specific digital points (or groups of digital points). In some embodiments, instead of determining which change in status areas, change in zone areas, or no change areas pass through a street segment, a determination may be made as to which change in status areas, change in zone areas, or no change areas pass through a parcel or group of data points (and a corresponding indicator of change type="S", change type="Z", or change type="N" applied to the geographic area description as described with respect to street segment embodiments.)

Figure 8:
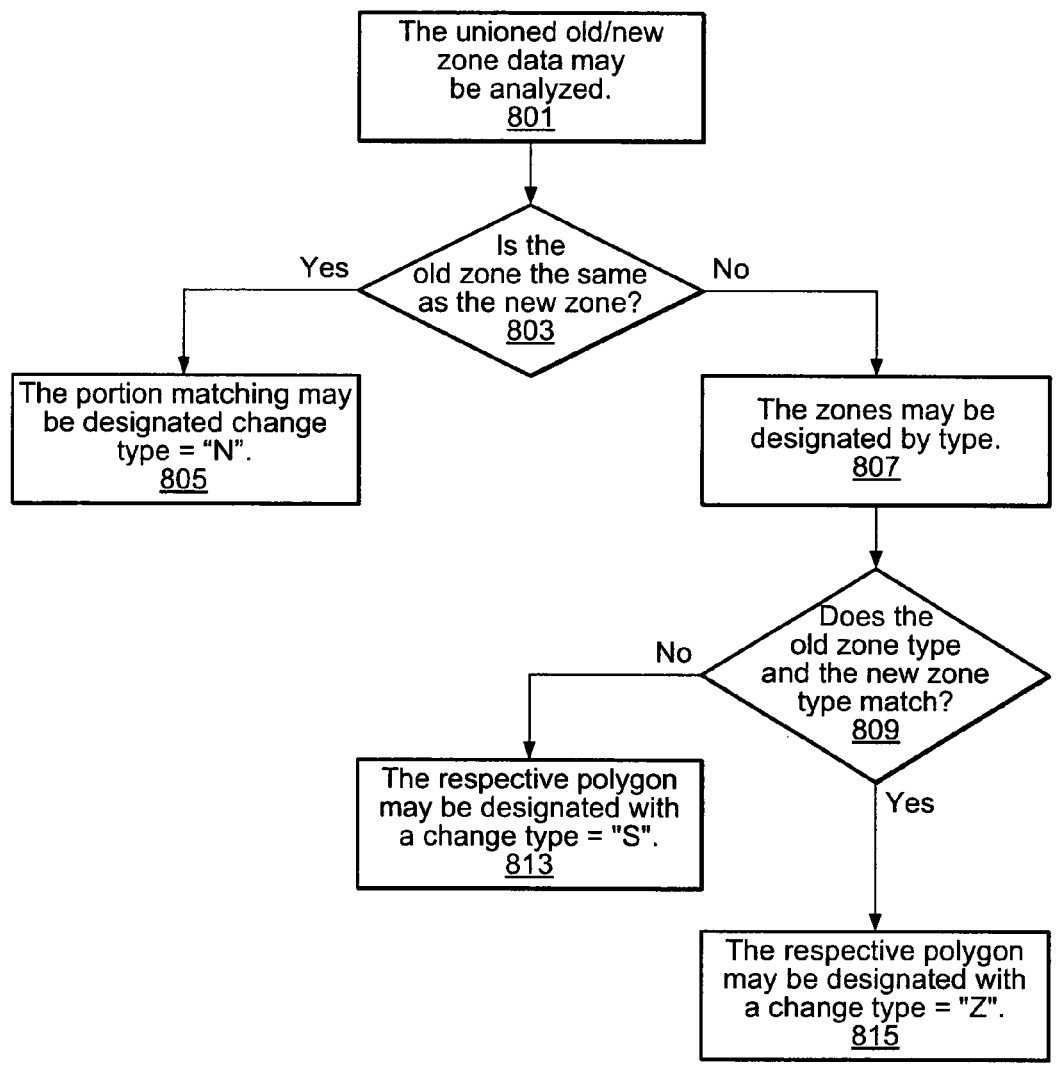
FIG. 8 illustrates a method for an old/new zone comparison, according to an embodiment.

FIG. 8 illustrates a method for an old/new zone comparison, according to an embodiment. It should be noted that in various embodiments of the methods described below, one or more of the elements described may be performed concurrently, in a different order than shown, or may be omitted entirely. Other additional elements may also be performed as desired.

At 801, the unioned old/new zone data may be analyzed. For example, the data may be compared in a digitized form by a computer system.

At 803, the old zone may be compared to the new zone. In some embodiments, the data may be compared on a point-by-point basis. In some embodiments, the data may be compared on a polygon-by-polygon basis (e.g., a polygon may be an area comprised of points). Other comparisons are also possible. In some embodiments, other change types may be used. For example, a number (e.g., 0) may be assigned to no change areas and a different number assigned to areas of change (e.g., 1).

At 805, if the old zone is the same as the new zone, the portion matching may be designated change type="N" (no change).

At 807, if at least a portion of the old zone is not the same as the new zone, the zones may be designated by type. For example, for each old zone and new zone, a determination may be made as to whether the zone is a high-risk flood zone or a non-high risk flood zone.

At 809, a comparison decision may be made on each zone. For example, overlapping polygons may be compared with each other. At 813, if the old status and the new status of a polygon do not match, the respective polygon may be designated with a change type="S" (or in some other way indicate that the polygon represents an area in which the status has changed between the old data and the new data.)

At 815, if the old status and the new status match, but the zones do not match, the respective polygon may be designated with a change type="Z" (or in some other way indicate that the polygon represents an area in which the zones have changed between the old data and the new data). In some embodiments, each polygon may be assigned three values (one for old zone value, one for new zone value, and one indicating type of change).

Figure 9A:
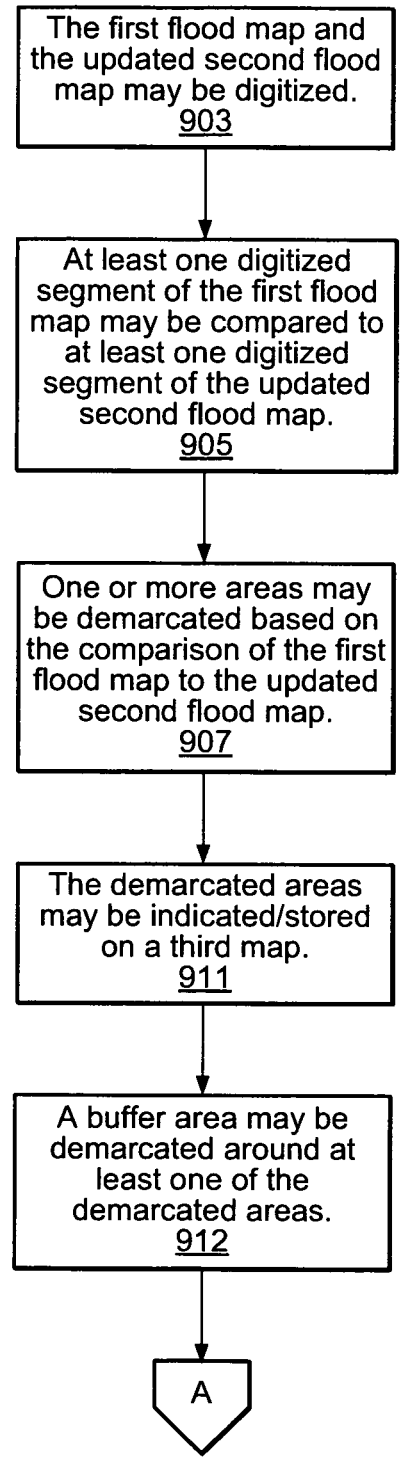
FIGS. 9a-c illustrate a method for a change detection process for demarcating areas for display, according to an embodiment.
Figure 9B:
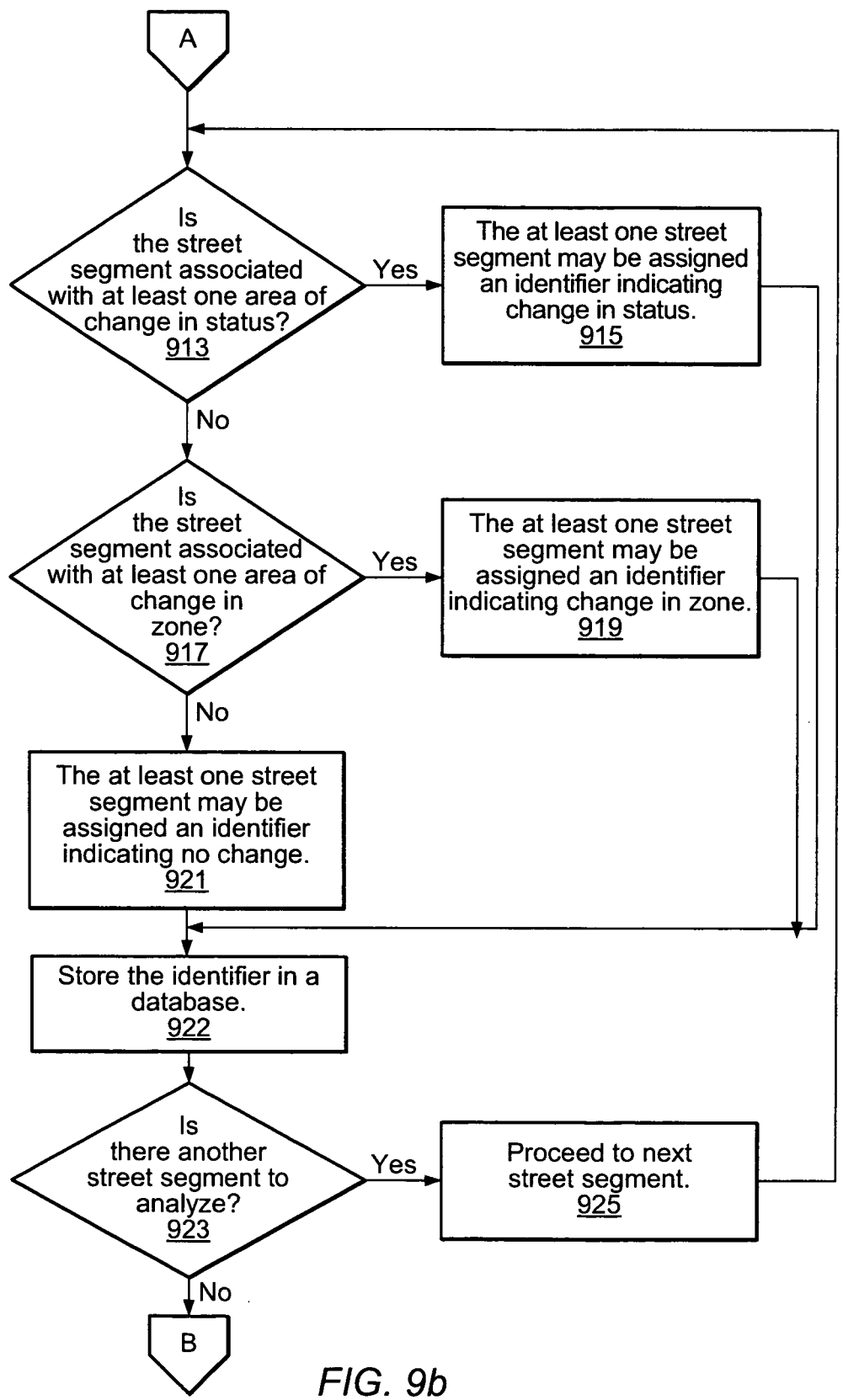
Figure 9C:
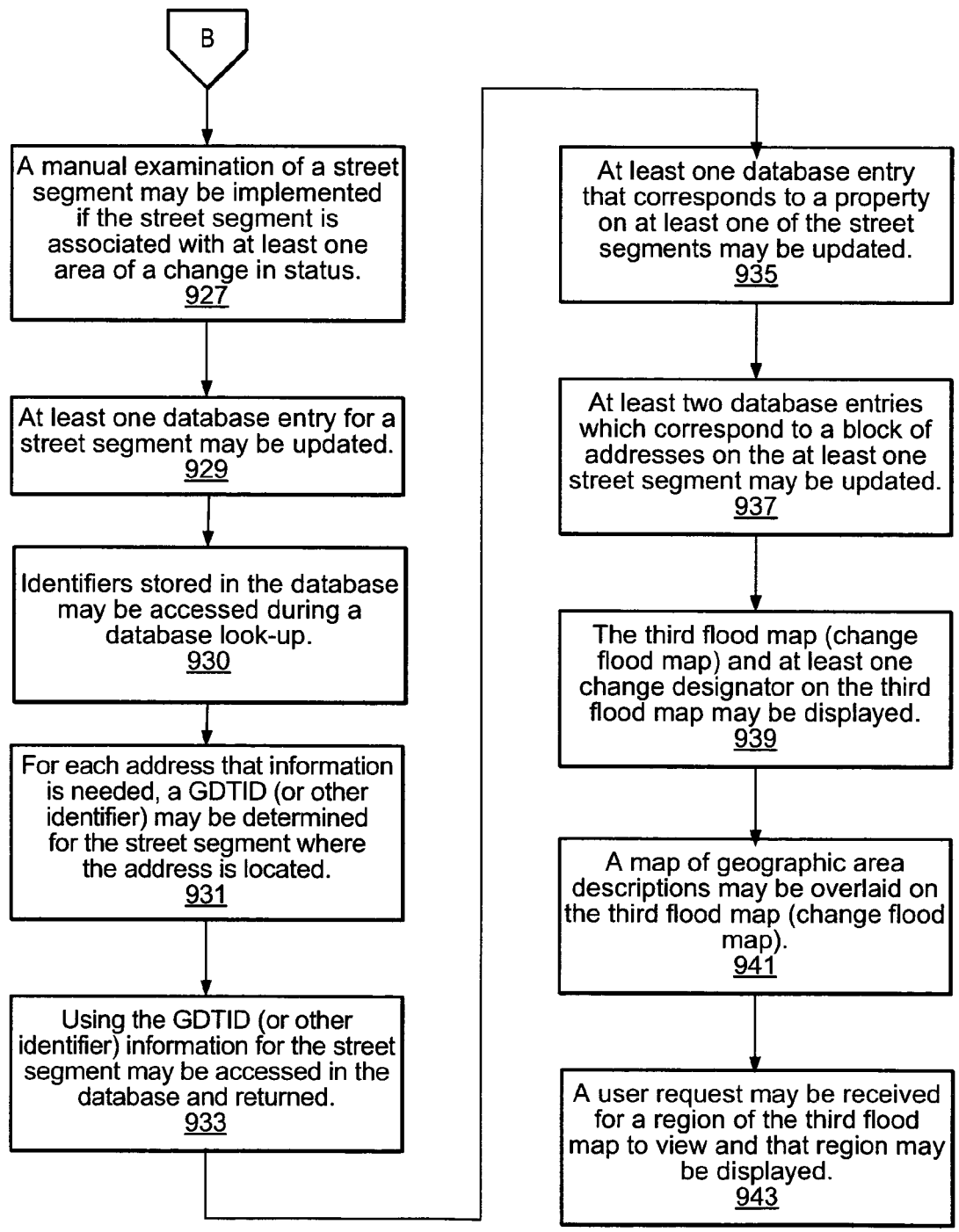

FIGS. 9a-c illustrate a method for a change detection process for demarcating areas for display, according to an embodiment. It should be noted that in various embodiments of the methods described below, one or more of the elements described may be performed concurrently, in a different order than shown, or may be omitted entirely. Other additional elements may also be performed as desired.

A first flood map may be compared to an updated second flood map. For example, at 903, the first flood map and the updated second flood map may be digitized, and at 905, at least one digitized segment of the first flood map may be compared to at least one digitized segment of the updated second flood map. In some embodiments, each digitized segment of the first flood map may be compared to the corresponding digitized segment of the updated second flood map.

At 907, one or more areas may be demarcated based on the comparison of the first flood map to the updated second flood map. At 911, these demarcated areas may be indicated/stored on a third flood map. The one or more areas may comprise one or more areas of a change in status and/or one or more areas of a change in zone. In some embodiments, demarcating may include demarcating a buffer area around at least one area. Additionally, one or more geographic area descriptions (e.g., street segments) may be identified on the comparison map. A street segment may be an entire street or a portion of a street.

At 912, a buffer area may be demarcated around at least one of the demarcated areas.

At 913, a determination may be made whether the street segment (or other geographic area description) is associated with at least one area of change in status. The determinations may be made for the street segments on the map. At 915, if the street segment is associated with at least one area of change in status, the street segment may be assigned an identifier indicating change in status. At 917, if the street segment is not associated with at least one area of change in status, a determination may be made whether the street segment is associated with at least one area of change in zone. At 919, if the street segment is associated with at least one area of change in zone, the street segment may be assigned an identifier indicating change in zone. At 921, if the street segment is not associated with at least one area of change in status and is not associated with at least one area of change in zone, the street segment may be assigned an identifier indicating no change.

At 922, the identifier may be stored in a database. For example, as seen in FIG. 4f, identifier may be stored in the database 488 according to change type 484 for the geographic area description (e.g., street segments).

At 923, a determination may be made whether there is another street segment to analyze on the map. At 925, if there is another street segment to analyze, the system may proceed to the next street segment and continue at 913.

At 927, a manual examination of a street segment (or other geographic area description) may be implemented if the street segment is associated with at least one area of a change in status. For example, even if only a portion of the street segment passes through a change in status area, the entire street segment may be manually inspected by a human user.

At 929, at least one database entry for a street segment (or other geographic area description) may be updated. In some embodiments, the database may not designate specific addresses, but may instead hold information with respect to specific geographic area descriptions (e.g., street segments). The data entries for the corresponding street segments in the database may be individually updated with, for example, the status determined for an area through which the street segment passes. In some embodiments, the status may be prioritized. For example, the street segment may be indicated as change type="S" if the street segment passes through a change in status area; indicated as a change type="Z" if the street segment does not pass through a change in status area but does pass through a change in zone area; and indicated as a change type="N" if it passes through neither a change in status area nor a change in zone area. If the street segment passes through both a change in status area and a change in zone area, the street segment may be given a change in status identifier, i.e., the change in status may take priority over a change in zone.

At 930, identifiers stored in the database may be accessed during a database look-up. For example, if an identifier is requested for a particular address (e.g., a user requested address), the address may be accessed according to a corresponding GDTID for the street segment (or other geographic area description) associated with the address. In some embodiments, addresses associated with the same type of identifier (e.g., addresses associated with a change in status identifier) may be searched in the database automatically and returned to a user for further analysis.

At 931, for the addresses that information is needed, a GDTID (or other identifier) may be determined for the street segment where the address is located. For example, another database may be accessed to determine the identifier for the street segment where a specific address is located. Other identifiers may also be used (for example, for other geographic area descriptions).

At 933, using the GDTID (or other identifier) information for the street segment (or other geographic area description) may be accessed in the database and returned.

At 935, at least one database entry that corresponds to an address on at least one of the street segments (or other geographic area descriptions) may be updated. In some embodiments, a link may be determined between addresses listed in a database and addresses on a corresponding street segment. The data entries for the corresponding addresses in the database may be individually updated with, for example, the status determined for an area through which the street segment passes.

At 937, at least two database entries which correspond to a range of addresses on the at least one street segment (or other geographic area description) may be updated. In some embodiments, database entries for a range of addresses (e.g., on the same street segment) may be updated at once.

At 939, the third flood map (change flood map) and at least one change designator (e.g., change type="S", change type="Z", or change type="N") on the third flood map may be displayed. Change designators may indicate a corresponding demarcated area type (e.g., change in status, change in zone, or no change).

At 941, a map of geographic area descriptions (e.g., street segments) may be overlaid on the third flood map (change flood map). In some embodiments, the one or more demarcated areas may be displayed with respect to at least one street segment (or other geographic area description). In some embodiments, the demarcated polygons and street segments may be displayed together (e.g., on a computer monitor). The user may zoom in on selected specific areas, specific street segments, or specific regions of the map. Other interactions between the user and the displayed map are also possible. In some embodiments, only changed areas may be displayed to a user (or the changed areas may be highlighted for the user). In some embodiments, obtained maps may be stored in a database and linked together (e.g., by managing designations for corresponding regions of the maps).

At 943, a user request may be received for a region of the third flood map (change flood map) to view and that region may be displayed. In some embodiments, when an identifier for a region (e.g., a region corresponding to a zip code) is requested by a user, the maps may be automatically overlaid such that the information in the requested region of each of the maps is displayed. In some embodiments, only the user requested region may be displayed. In some embodiments, the user may request a region by clicking on it or entering a region designator (e.g., a zip code). Other region selection methods are also contemplated. In some embodiments, different areas of the maps may be digitally linked and analyzed as if they were overlapped.

Figure 10:
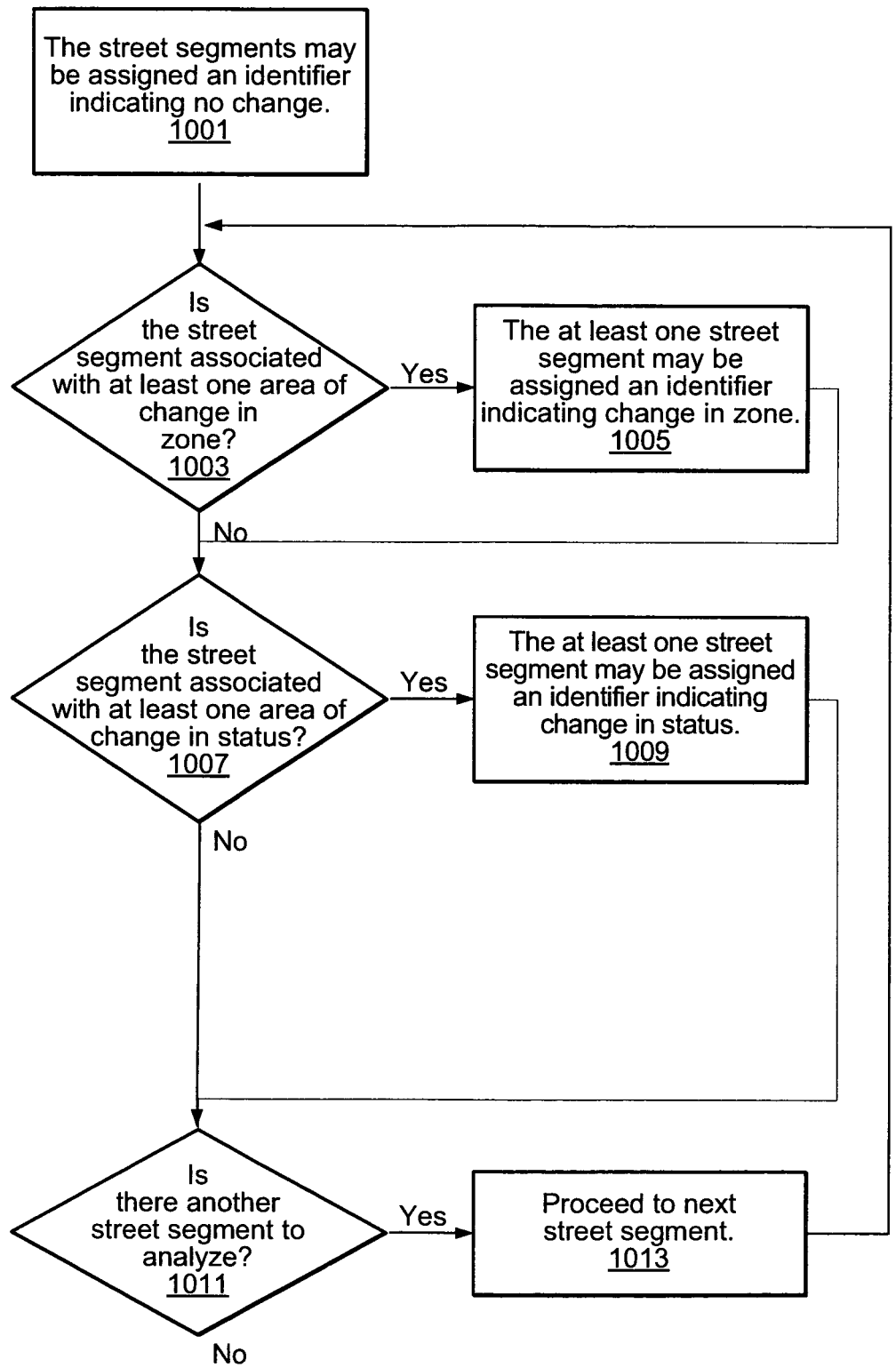
FIG. 10 illustrates another embodiment of a method for assigning identifiers to geographic area descriptions (e.g., street segments).

FIG. 10 illustrates another embodiment for assigning identifiers to geographic area descriptions (e.g., street segments). It should be noted that in various embodiments of the methods described below, one or more of the elements described may be performed concurrently, in a different order than shown, or may be omitted entirely. Other additional elements may also be performed as desired.

At 1001, the street segments (or other geographic area descriptions) may be assigned an identifier indicating no change. In some embodiments, the street segments may be given a default identifier of change type="N".

At 1003, a determination may be made whether the street segment is associated with at least one area of change in zone. In some embodiments, the street segments may be analyzed one-by-one. In some embodiments, the street segments may be analyzed in groups.

At 1005, if the street segment is associated with at least one area of change in zone, the at least one street segment may be assigned an identifier indicating change in zone. In some embodiments, the change in zone identifier may overwrite the no change identifier (assigned in 1001). Flow may return to 1007.

At 1007, a determination may be made whether the street segment is associated with at least one area of change in status.

At 1009, if the street segment is associated with at least one area of change in status, the at least one street segment may be assigned an identifier indicating change in status. In some embodiments, the change in status identifier may overwrite the change in zone identifier (assigned in 1005) or the no change identifier (assigned in 1001).

At 1011, a determination may be made whether there is another street segment to analyze. At 1013, if there is another street segment to analyze, the flow may proceed to the next street segment.

As seen in FIG. 10, the street segments (or other geographic area descriptions) may initially have indicators of change type="N" assigned to them. The indicators may then be updated in a prioritized order. For example, the indicator change type="Z" may be applied to the street segments passing through a change in zone area and then the indicator change type="S" may be applied to the street segments passing through a change in status area. This ordering may allow change type="S" to overwrite change type="Z" as appropriate. For example, if a street segment has an indicator change type="S" it may also be in a change type="Z" area. By applying the changes in the above described order, the street segments passing even partially through a change in status area may receive a final identifier of change type="S" (which may overwrite a previous indicator change type="Z"). Other priorities are also contemplated.

Figure 11:
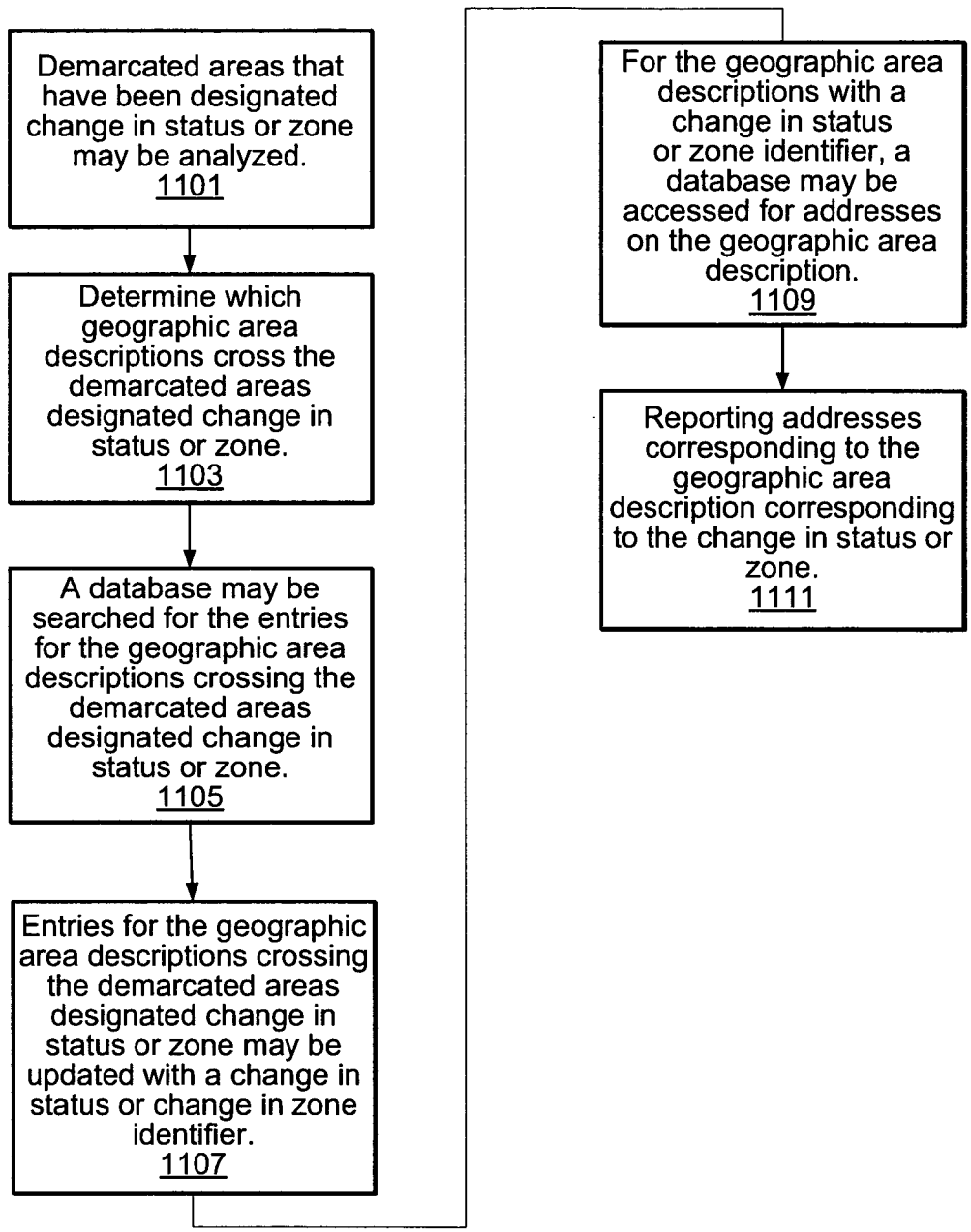
FIG. 11 illustrates an embodiment of a method for searching and replacing identifiers.

FIG. 11 illustrates an embodiment of a method for searching and updating identifiers. It should be noted that in various embodiments of the methods described below, one or more of the elements described may be performed concurrently, in a different order than shown, or may be omitted entirely. Other additional elements may also be performed as desired.

At 1101, demarcated areas that have been designated change in status or change in zone may be analyzed.

At 1103, a determination may be made as to which geographic area descriptions (e.g., street segments) cross the demarcated areas designated change in status or change in zone.

At 1105, a database may be searched for the entries for the geographic area descriptions crossing the demarcated areas designated change in status or change in zone.

At 1107, entries for the geographic area descriptions crossing the demarcated areas designated change in status or change in zone may be updated with a change in status or zone identifier in the database (or initially stored in the database). In some embodiments, geographic area descriptions with identifiers associated with no change may be ignored (in some embodiments they may also be processed).

At 1109, for the geographic area descriptions with a change in status or zone identifier, a database may be accessed (e.g., searched) for addresses, parcels, geocoded points, etc. on the geographic area description. In some embodiments, the identifiers may be stored with a geographic area description identifier (e.g., a street segment identifier) that corresponds to a group of addresses. A separate database (or the same database) may be searched for addresses corresponding to the geographic area descriptions.

At 1111, addresses corresponding to the geographic area description corresponding to the change in status or zone identifier may be reported. Reporting may include generating a report, sending an email, alerting a loan company, etc. In some embodiments, reports may be generated for addresses in which a request for status determination was submitted by a user (e.g., a loan company). In some embodiments, an identifier for a requested address may be searched by determining which geographic area description corresponds to the address and then determining the identifier stored for that geographic area description. The identifier may then be returned for the requested address instead of (or in addition to) reporting the addresses corresponding the geographic area description with a change in status or zone.

Figure 12:
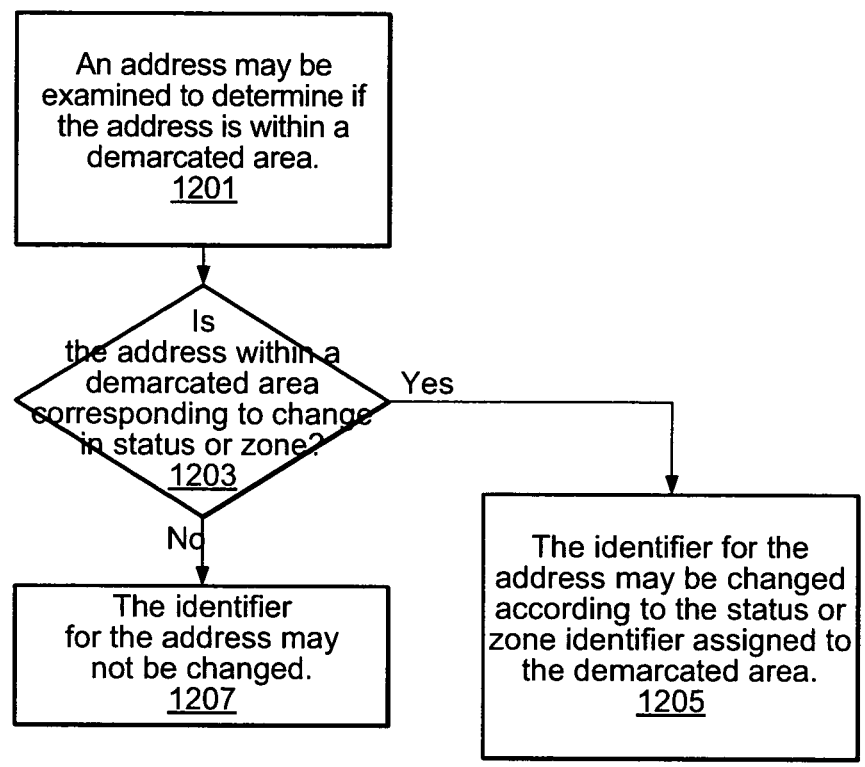
FIG. 12 illustrates an embodiment of a method for analyzing addresses in the demarcated areas.

FIG. 12 illustrates an embodiment of a method for analyzing addresses in demarcated areas. It should be noted that in various embodiments of the methods described below, one or more of the elements described may be performed concurrently, in a different order than shown, or may be omitted entirely. Other additional elements may also be performed as desired.

At 1201, an address may be examined (e.g., visually) to determine if the address is within a demarcated area corresponding to a change in status or a change in zone.

At 1203, a decision may be made as to whether the address is within a demarcated area corresponding to a change in status or a change in zone.

At 1205, if the address is within a demarcated area corresponding to a change in status or a change in zone, an appropriate identifier for the address may be changed in a database, initially stored in a database, or reported according to the status or zone identifier assigned to the corresponding demarcated area. For example, the previous identifier for the address may be replaced with the new identifier.

At 1207, if the address does not fall within a demarcated area corresponding to a change in status or a change in zone, the identifier for the address may not be changed.

In some embodiments, addresses on a street segment (or other geographic area description) with a change in status or zone may be manually analyzed and the classification of the addresses may be correspondingly placed in the database. In some embodiments, addresses on a street segment (or other geographic area description) with a change in status or zone may be automatically analyzed and the classification of the addresses may be automatically placed in the database.

In some embodiments, a loan provider, loan recipient, etc. for an address may be notified of a change in status or change in zone for that address. For example, electronic communications or paper correspondence may be automatically generated for addresses or groups of addresses that have had a change in status or zone. In some embodiments, a database lookup may instead be performed for geographic area descriptions (e.g., street segments) corresponding to specific addresses. If needed, a manual inspection of the geographic area description (e.g., street segment) may be implemented to verify the status of the address. Notified loan providers may then require loan recipients of corresponding addresses to secure flood insurance, secure additional/less flood insurance, or may notify the recipient that flood insurance is no longer required.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising: comparing, by a processor a first flood map to an updated second flood map, said first flood map and said updated second flood map each including flood zones and non-flood zones; and creating, by a processor a third flood map, wherein the third flood map includes one or more demarcated areas based on the comparison of the first flood map to the updated second flood map, and wherein the one or more demarcated marking areas comprises a change designator indicating a change in risk level status of the first flood map to the updated second flood map and another designator indicating a change in zone of at least one area from the first flood map to the updated second flood map, wherein both designators are derived from the comparison of the first flood map to the updated second flood map.

2. The method of claim 1, wherein the one or more demarcated areas comprise at least one area of no change.

3. The method of claim 1, wherein the one or more demarcated areas comprise at least one area of a change in risk level status designation and at least one area of a change in zone designation that is not a change in risk level status designation.

4. The method of claim 1, further comprising demarcating a buffer area around at least one area of the one or more demarcated areas.

5. The method of claim 1, further comprising determining which of the one or more demarcated areas is associated with at least one geographic area description.

6. The method of claim 5, wherein the demarcated area is associated with at least one geographic area description if at least a portion of the geographic area description crosses through the demarcated area.

7. The method of claim 5, wherein the at least one geographic area description is a street segment.

8. The method of claim 7, further comprising prioritizing the one or more demarcated areas associated with the at least one street segment, wherein prioritizing comprises: assigning the at least one street segment an identifier indicating change in risk level status designation if the street segment is associated with at least one demarcated area of the one or mare demarcated areas with a change in risk level status designation; assigning the at least one street segment an identifier indicating change in zone if the street segment is not associated with at least one demarcated area of the one or more demarcated areas with the change in risk level status designation and is associated with at least one demarcated area of the one or more demarcated areas with a change in zone designation; and assigning the at least one street segment an identifier indicating no change if the street segment is not associated with at least one demarcated area of the one or more demarcated areas with the change in risk level status designation and is not associated with at least one demarcated area of the one or more demarcated areas with the change in zone designation.

9. The method of claim 7, further comprising prioritizing the one or more demarcated areas associated with the at least one street segment, wherein prioritizing comprises: assigning the at least one street segment an identifier indicating no change; assigning the at least one street segment an identifier indicating change in zone designation if the street segment is associated with at least one demarcated area of the one or more demarcated areas with a change in zone designation; and assigning the at least one street segment an identifier indicating change in risk level status designation if the street segment is associated with at least one demarcated area of the one or more demarcated areas with a change in risk level status designation.

10. The method of claim 1, wherein the first flood map and the updated second flood map are Flood Insurance Rate Maps (FIRMs).

11. The method of claim 1, wherein one or more demarcated areas comprise at least one area of a change in zone designation that is not an area of a change in risk level status designation.

12. The method of claim 1, wherein comparing a first flood map to an updated second flood map comprises: digitizing the first flood map and the updated second flood map; and comparing at least one digitized area of the first flood map to at least one digitized area of the updated second flood map.

13. A system, comprising: a processor; a memory coupled to the processor and configured to store program instructions executable by the processor to: compare a first flood map to an updated second flood map, said first flood map and said updated second flood map each including flood zones and non-flood zones; and create a third flood map, wherein the third flood map includes one or more demarcated areas based on the comparison of the first flood map to the updated second flood map; wherein the one or more demarcated marking areas comprises a change designator indicating a change in risk level status of the first flood map to the updated second flood map designation and another designator indicating a change in zone of at least one area from the first flood map to the updated second flood map, wherein both designators are derived from the comparison of the first flood map to the updated second flood map.

14. The system of claim 13, wherein the one or more demarcated areas comprise at least one area of no change.

15. The system of claim 13, wherein the one or more demarcated areas comprise at least one area of a change in risk level status designation and at least one area of a change in zone designation that is not a change in risk level status designation.

16. The system of claim 13, wherein the program instructions are further executable to demarcate a buffer area around at least one area of the one or more demarcated areas.

17. The system of claim 13, wherein the program instructions are further executable to determine which of the one or more demarcated areas is associated with at least one geographic area description.

18. The system of claim 17, wherein the demarcated area is associated with at least one geographic area description if at least a portion of the geographic area description crosses through the demarcated area.

19. The system of claim 17, wherein the at least one geographic area description is a street segment.

20. The system of claim 19, wherein the program instructions are further executable to prioritize the one or more demarcated areas associated with the at least one street segment, wherein prioritizing comprises: assigning the at least one street segment an identifier indicating change in risk level status designation if the street segment is associated with at least one demarcated area of the one or more demarcated areas with a change in risk level status designation; assigning the at least one street segment an identifier indicating change in zone designation if the street segment is not associated with at least one demarcated area of the one or more demarcated areas with the change in risk level status designation and is associated with at least one demarcated area of the one or more demarcated areas with a change in zone designation; and assigning the at least one street segment an identifier indicating no change if the street segment is not associated with at least one demarcated area of the one or more demarcated areas with the change in risk level status designation and is not associated with at least one demarcated area of the one or more demarcated areas with the change in zone designation.

21. The system of claim 19, wherein the program instructions are further executable to prioritize the one or more demarcated areas associated with the at least one street segment, wherein prioritizing comprises: assigning the at least one street segment an identifier indicating no change; assigning the at least one street segment an identifier indicating change in zone designation if the street segment is associated with at least one demarcated area of the one or more demarcated areas with a change in zone designation; and assigning the at least one street segment an identifier indicating change in risk level status designation if the street segment is associated with at least one demarcated area of the one or more demarcated areas with a change in risk level status designation.

22. The system of claim 13, wherein the first flood map and the updated second flood map are Flood Insurance Rate Maps (FIRMs).

23. The system of claim 13, wherein one or more demarcated areas comprise at least one area of a change in zone designation that is not an area of a change in risk level status designation.

24. The system of claim 13, wherein comparing a first flood map to an updated second flood map comprises: digitizing the first flood map and the updated second flood map; and comparing at least one digitized area of the first flood map to at least one digitized area of the updated second flood map.

25. A non-transitory, computer readable storage medium comprising program instructions, wherein the program instructions are computer-executable to: compare a first flood map to an updated second flood map, said first flood map and said updated second flood map each including flood zones and non-flood zones; and create a third flood map, wherein the third flood map includes one or more demarcated areas based on the comparison of the first flood map to the updated second flood map; wherein the one or more demarcated marking areas comprises a change designator indicating a change in risk level status of the first flood map to the updated second flood map and another designator indicating a change in zone of at least one area from the first flood map to the updated second flood map, wherein both designators are derived from the comparison of the first flood map to the updated second flood map.

26. The non-transitory computer readable medium of claim 25, wherein the one or more demarcated areas comprise at least one area of no change.

27. The non-transitory computer readable medium of claim 25, wherein the one or more demarcated areas comprise at least one area of a change in risk level status designation and at least one area of a change in zone designation that is not a change in risk level status designation.

28. The non-transitory computer readable medium of claim 25, wherein the program instructions are further executable to demarcate a buffer area around at least one area of the one or more demarcated areas.

29. The non-transitory computer readable medium of claim 25, wherein the program instructions are further executable to determine which of the one or more demarcated areas is associated with at least one geographic area description.

30. The non-transitory computer readable medium of claim 29, wherein the demarcated area is associated with at least one geographic area description if at least a portion of the geographic area description crosses through the demarcated area.

31. The non-transitory computer readable medium of claim 29, wherein the at least one geographic area description is a street segment.

32. The non-transitory computer readable medium of claim 31, wherein the program instructions are further executable to prioritize the one or more demarcated areas associated with the at least one street segment, wherein prioritizing comprises: assigning the at least one street segment an identifier indicating change in risk level status designation if the street segment is associated with at least one demarcated area of the one or more demarcated areas with a change in risk level status designation; assigning the at least one street segment an identifier indicating change in zone designation if the street segment is not associated with at least one demarcated area of the one or more demarcated areas with the change in risk level status designation and is associated with at least one demarcated area of the one or more demarcated areas with a change in zone designation; and assigning the at least one street segment an identifier indicating no change if the street segment is not associated with at least one demarcated area of the one or more demarcated areas with the change in risk level status designation and is not associated with at least one demarcated area of the one or more demarcated areas with the change in zone designation.

33. The non-transitory computer readable medium of claim 31, wherein the program instructions are further executable to prioritize the one or more demarcated areas associated with the at least one street segment, wherein prioritizing comprises: assigning the at least one street segment an identifier indicating no change; assigning the at least one street segment an identifier indicating change in zone designation if the street segment is associated with at least one demarcated area of the one or more demarcated areas with a change in zone designation; and assigning the at least one street segment an identifier indicating change in risk level status designation if the street segment is associated with at least one demarcated area of the one or more demarcated areas with a change in risk level status designation.

34. The non-transitory computer readable medium of claim 25, wherein the first flood map and the updated second flood map are Flood Insurance Rate Maps (FIRMs).

35. The non-transitory computer readable medium of claim 25, wherein one or more demarcated areas comprise at least one area of a change in zone designation that is not an area of a change in risk level status designation.

36. The non-transitory computer readable medium of claim 25, wherein comparing a first flood map to an updated second flood map comprises: digitizing the first flood map and the updated second flood map; and comparing at least one digitized area of the first flood map to at least one digitized area of the updated second flood map.

* * * * *